United States Patent
Hwang et al.

(10) Patent No.: US 10,884,873 B2
(45) Date of Patent: Jan. 5, 2021

(54) METHOD AND APPARATUS FOR RECOVERY OF FILE SYSTEM USING METADATA AND DATA CLUSTER

(71) Applicant: ELECTRONICS AND TELECOMMUNICATIONS RESEARCH INSTITUTE, Daejeon (KR)

(72) Inventors: Hyunuk Hwang, Daejeon (KR); Kibom Kim, Daejeon (KR); Seungyong Lee, Daejeon (KR); Seongtaek Chee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1018 days.

(21) Appl. No.: 15/224,853

(22) Filed: Aug. 1, 2016

(65) Prior Publication Data

US 2017/0139783 A1 May 18, 2017

(30) Foreign Application Priority Data

Nov. 17, 2015 (KR) ........................ 10-2015-0160868

(51) Int. Cl.
*G06F 16/27* (2019.01)
*G06F 11/14* (2006.01)
*G06F 16/17* (2019.01)

(52) U.S. Cl.
CPC ...... *G06F 11/1469* (2013.01); *G06F 11/1435* (2013.01); *G06F 16/1727* (2019.01); *G06F 2201/80* (2013.01)

(58) Field of Classification Search
CPC .............. G06F 11/2069; G06F 3/0689; G06F 11/1435; G06F 11/1451; G06F 11/2023;
(Continued)

(56) References Cited

U.S. PATENT DOCUMENTS 6,185,575 B1 * 2/2001 Orcutt ................. G06F 16/1724
6,330,653 B1 * 12/2001 Murray ................ G06F 3/0605
 711/173

(Continued)

FOREIGN PATENT DOCUMENTS

KR 10-2003-0075738 A 9/2003
KR 10-2008-0107629 A 12/2008
(Continued)

OTHER PUBLICATIONS

Jaeung Namgung et al., "A research for partition recovery method in a forensic perspective", Journal of The Korea Institute of Information Security & Cryptology(JKIISC), vol. 23, No. 4, Aug. 2013.

*Primary Examiner* — Alex Gofman
*Assistant Examiner* — Linh Black
(74) *Attorney, Agent, or Firm* — LRK Patent Law Firm

(57) ABSTRACT

A method and an apparatus for recovery of a file system using metadata and data clusters. The apparatus for recovery of a file system generates an MFT entry list in a disc or an evidence image, collects at least one data cluster candidate, and uses at least one MFT entry and at least one data cluster candidate within the MFT entry list to generate at least one MFT entry-data cluster pair candidate. The apparatus for recovery of a file system analyzes the at least one MFT entry-data cluster pair candidate to determine attribute values of a virtual partition and generate the virtual partition based on the attribute values.

18 Claims, 31 Drawing Sheets

(58) Field of Classification Search
CPC ............. G06F 16/188; G06F 2212/152; G11B 27/329
USPC .................. 707/655–660, 737, 810, E17.046, 707/E17.048, E17.089, E17.091, E17.092
See application file for complete search history.

(56) References Cited

U.S. PATENT DOCUMENTS

| | | | |
|---|---|---|---|
| 6,377,958 B1* | 4/2002 | Orcutt | G06F 16/116 707/690 |
| 8,392,378 B2* | 3/2013 | Pafumi | G06F 11/1658 707/679 |
| 8,458,413 B2* | 6/2013 | Ganti | G06F 12/08 707/655 |
| 8,635,429 B1* | 1/2014 | Naftel | G06F 11/1446 711/206 |
| 9,104,339 B1* | 8/2015 | Kalekar | G06F 3/0644 |
| 9,164,845 B2 | 10/2015 | Hwang et al. | |
| 9,286,165 B2 | 3/2016 | Hwang et al. | |
| 9,483,469 B1* | 11/2016 | Chiueh | G06F 3/0643 |
| 9,754,303 B1* | 9/2017 | Jagtap | G06Q 30/0631 |
| 2005/0246612 A1* | 11/2005 | Leis | G06F 11/0727 714/763 |
| 2011/0055163 A1 | 3/2011 | Hwang et al. | |
| 2011/0113194 A1* | 5/2011 | Terry | G06F 3/0607 711/114 |
| 2011/0202794 A1 | 8/2011 | Kim | |
| 2012/0066546 A1 | 3/2012 | Kim | |
| 2013/0227558 A1* | 8/2013 | Du | G06F 9/45558 718/1 |
| 2015/0089182 A1* | 3/2015 | Singh | G06F 11/00 711/173 |
| 2016/0077918 A1 | 3/2016 | Hwang et al. | |

FOREIGN PATENT DOCUMENTS

| | | |
|---|---|---|
| KR | 10-2011-0094468 A | 8/2011 |
| KR | 10-1078289 B1 | 10/2011 |
| KR | 10-2014-0026821 A | 3/2014 |
| KR | 10-1403305 B1 | 6/2014 |
| KR | 10-1593184 B1 | 2/2016 |

* cited by examiner

NTFS BOOT RECORD

| OFFSET | NAME | DESCRIPTION |
|---|---|---|
| 0~2 | JUMP BOOT CODE | "JUMP TO BOOT CODE" INSTRUCTION |
| 3~10 | OEM NAME | OEM NAME |
| 11~12 | BYTES PER SECTOR | THE NUMBER OF BYTES PER SECTOR |
| 13 | SECTOR PER CLUSTER | THE NUMBER OF SECTORS PER CLUSTER |
| 14~20 | NOT USED | NON-USE (FILLED WITH 0) |
| 21 | MEDIA DESCRIPTOR | TYPE OF MEDIA IN WHICH VOLUME IS STORED |
| 22~23 | NOT USED | NON-USE (FILLED WITH 0) |
| 24~25 | SECTOR PER TRACK | THE NUMBER OF SECTORS PER TRACK |
| 26~27 | NUMBER OF HEADS | THE NUMBER OF HEADERS |
| 28~31 | HIDDEN SECTORS | THE NUMBER OF SECTORS FROM START OF BR TO START OF PHYSICAL DISC |
| 32~35 | SECTOR COUNT | THE NUMBER OF SECTORS (NON-USE, ALWAYS 0) |
| 36~39 | SECTORS PER FAT | SECTORS PER FAT (NON-USE, ALWAYS 0) |
| 40~47 | SECTOR COUNT | TOTAL NUMBER OF SECTORS |
| 48~55 | START OF MFT | MFT START CLUSTER ADDRESS |
| 56~63 | START OF MFTMIRR | MFTMIRR START CLUSTER ADDRESS |
| 64~67 | MFT ENTRY SIZE | MFT ENTRY SIZE |
| 68~71 | INDEX RECORD SIZE | INDEX RECORD SIZE |
| 72~79 | VOLUME SERIAL NUMBER | VOLUME SERIAL NUMBER |
| 80~83 | $MFT CHECKSUM | $MFT CHECK SUM (NON-USE, ALWAYS 0) |

FIG. 18

MFT ENTRY HEADER

| OFFSET | NAME | DESCRIPTION |
|---|---|---|
| 0~3 | SIGNATURE | SIGNATURE ("FILE" CHARACTER STRING) |
| 4~5 | OFFSET OF FIXUP ARRAY | POSITION OF FIXUP ARRANGEMENT |
| 6~7 | COUNT OF FIXUP VALUE | THE NUMBER OF TERMS OF FIXUP ARRANGEMENT |
| 8~15 | LOGFILE SEQUENCE NUMBER | LOG FILE SEQUENCE NUMBER (POSITION VALUE OF TRANSACTION) |
| 16~17 | SEQUENCE VALUE | SEQUENCE VALUE |
| 18~19 | HARD LINK COUNT | THE NUMBER OF HARD LINKS |
| 20~21 | OFFSET TO FIRST ATTRIBUTE | OFFSET AT WHICH FIRST ATTRIBUTE STARTS |
| 22~23 | FLAGS | STATE OR ATTRIBUTE INFORMATION OF MFT ENTRY<br>00 00 : DELETED FILE<br>01 00 : ALLOCATED FILE<br>02 00 : DELETED DIRECTORY<br>03 00 : ALLOCATED DIRECTORY |
| 24~27 | USED SIZE OF MFT ENTRY | SIZE ACTUALLY USED BY MFT ENTRY |
| 28~31 | ALLOCATED SIZE OF MFT ENTRY | ALLOCATION SIZE OF MFT ENTRY, 1024BYTES |
| 32~39 | FILE REFERENCE TO BASE MFT ENTRY | FILE REFERENCE ADDRESS OF BASE MFT ENTRY IN CASE OF NON BASE MFT ENTRY |
| 40~41 | NEXT ATTRIBUTE ID | IDS OF ATTRIBUTES ALLOCATED ONLY WITHIN MFT ENTRY |
| 42~43 | PADDING | PADDING OF 00 00 VALUE |
| 44~47 | $MFT RECORD NUMBER | MFT IDENTIFIER |

FIG. 19

MFT ENTRY ATTRIBUTE HEADER

| OFFSET | NAME | DESCRIPTION |
|---|---|---|
| 0~3 | ATTRIBUTE IDENTIFIER CODE | ATTRIBUTE IDENTIFIER CODE (ATTRIBUTE HEADER) |
| 4~7 | LENGTH OF ATTRIBUTE | ATTRIBUTE LENGTH |
| 8 | NON-RESIDENT FLAG | NON-RESIDENT FLAG |
| 9 | LENGTH OF NAME | LENGTH OF ATTRIBUTE NAME |
| 10~11 | OFFSET TO NAME | POSITION OF ATTRIBUTE NAME |
| 12~13 | FLAGS | SEVERAL STATE FLAGS (COMPRESSION, CODING, SPARSE) OF ATTRIBUTE |
| 14~15 | ATTRIBUTE IDENTIFIER | ATTRIBUTE IDENTIFIER |

FIG. 20A

RESIDENT ATTRIBUTES

| OFFSET | NAME | DESCRIPTION |
|---|---|---|
| 16~19 | SIZE OF CONTENT | SIZE OF ATTRIBUTE CONTENT |
| 20~21 | OFFSET TO CONTENT | START POSITION OF ATTRIBUTE CONTENT |
| 22 | INDEXED FLAG | FLAG INDICATING WHETHER ATTRIBUTE IS ATTRIBUTE USED FOR SEARCH |
| 23 | PADDING | PADDING |
| 24~ | NAME OF ATTRIBUTE (NAMED ATTRIBUTE) | NAME OF ATTRIBUTE |
| 24~ | START OF ATTRIBUTE (UN-NAMED ATTRIBUTE) | START OF ATTRIBUTE |

FIG. 20B

NON-RESIDENT ATTRIBUTES

| OFFSET | NAME | DESCRIPTION |
|---|---|---|
| 16~23 | STARTING VCN OF THE RUNLIST | START VCN OF RUN LIST |
| 24~31 | ENDING VCN OF THE RUNLIST | FINAL VCN OF RUN LIST |
| 32~33 | OFFSET OF THE RUNLIST | POSITION OF RUN LIST |
| 34~35 | COMPRESSION UNIT SIZE | SIZE OF COMPRESSION UNIT |
| 36~39 | PADDING | PADDING |
| 40~47 | ALLOCATED SIZE OF ATTRIBUTE CONTENT | WHOLE CLUSTER SIZE TO WHICH ATTRIBUTE DATA ARE ALLOCATED (BYTE UNIT) |
| 48~55 | REAL SIZE OF ATTRIBUTE CONTENT | REAL CLUSTER SIZE TO WHICH ATTRIBUTE DATA ARE ALLOCATED (BYTE UNIT) |
| 56~63 | INITIALIZED SIZE OF ATTRIBUTE CONTENT | WHOLE CLUSTER SIZE IN WHICH ATTRIBUTE DATA ARE INITIALIZED (BYTE UNIT) |
| 64~ | CLUSTER DATA RUN LIST(UNNAMED STREAM) | RUN LIST |
| 64~ | ATTRIBUTE NAME (NAMED STREAM) | NAME OF ATTRIBUTE |

FIG. 20C

```
struct _MFT_ENTRY_LIST {
    INT64   _mftid;         // START MFT IDENTIFIER
    INT64   _sector_offset; // START PHYSICAL SECTOR OFFSET
    INT32   _mft_count;     // THE NUMBER OF MFT ENTRIES
} MFT_Entry_List;
```

FIG. 21

```
struct   MFT_ENTRY_CANDIDATE {
    INT64   defined_id;      // PREDEFINED MFT ENTRY IDENTIFIER
    INT64   sector_offset;   // START PHYSICAL SECTOR OFFSET
    INT32   sector_len;      // SIZE
} MFT_Entry_Candidate;
```

FIG. 22

```
struct DATA_CLUSTER_CANDIDATE {
    INT64  _defined_id;      // PREDEFINED DATA CLUSTER IDENTIFIER
    INT64  _sector_offset;   // START PHYSICAL SECTOR OFFSET
    INT32  _sector_len;      // SIZE
} Data_Cluster_Candidate;
```

FIG. 23

METHOD AND APPARATUS FOR RECOVERY OF FILE SYSTEM USING METADATA AND DATA CLUSTER

CROSS REFERENCE TO RELATED APPLICATIONS

This application claims the benefit of Korean Patent Application No. 10-2015-0160868, filed Nov. 17, 2015, which is hereby incorporated by reference in their entirety into this application.

BACKGROUND OF THE INVENTION

1. Technical Field

The present invention relates generally to a file system, and more particularly, to a method and an apparatus for recovery of a file system using metadata and data clusters.

2. Description of the Related Art

As a capacity of storages such as a hard disk is increased, an operating system for a computer system uses a file system suitable for large-capacity storages. For example, a windows operating system provides an NTFS file system supporting the large-capacity storages.

In accordance with the trend, the large-capacity file system becomes a main destruction target for a cyber terror.

When the file system is destroyed due to the cyber terror or other factors, an operation for recovery of the destroyed file system needs to be performed.

For the recovery of the file system, predefined information is required.

One of the core information for the recovery of the file system is a master file table (MFT). The MFT is used in the NTFS, an NTFS compatible file system, etc. The MFT includes information on all files and directories of a volume of the file system. For example, the MFT includes a file name, a directory name, file related time, directory related time, a file size, etc.

The MFT entry is an entry maintaining the file or directory information, in a content of a "$MFT" metadata file. For example, the MFT entry may have a fixed size such as 1024 bytes. Which of the file and the directory the MFT entry indicates may be designated by an attribute record type of the MFT entry. As it were, if the attribute record type of the MFT entry is a file, the MFT entry indicates the file. If the attribute record type of the MFT entry is a directory, the MFT entry indicates the directory.

Hereinafter, the MFT entry indicating the file is named the MFT entry of the file and the MFT entry indicating the directory is named the MFT entry of the directory.

A data cluster may be the file that the MFT entry indicates or a data content of the directory. As it were, the MFT entry and the data cluster corresponding to each other may each be the file or directory information and data of the file or the directory. For the file or the directory, the MFT entry may indicate information for an access to the file or the director and the data cluster may indicate the content of the file or the directory.

A file that is a No. 0 MFT entry is a "$MFT" metadata file. The "$MFT" metadata file includes information on the whole MFT. Therefore, a general forensics tool acquires information to be used for recovery by analyzing the "$MFT" metadata file including information on a layout of the whole MFT.

For example, in the NTFS, a $MFT start cluster address may indicate a start position of the $MFT metadata. The $MFT start cluster address is stored in a region in which an offset in a boot record (BR) of the NIB is 48 to 55. Here, a unit of the offset may be a byte. A position of the boot record (BR) managing the volume information is managed as partition management information, like a master boot record (MBR) or a GUM partition table (OPT). That is, under the general situation that the file system is analyzed, the forensics tool may analyze the MBR or the GPT to acquire the position of the BR. Further, the forensics tool may acquire basic information on the partition based on the information on the BR and acquire a position at which the metadata information of the file starts. The basic information on the partition may include a sector size, a cluster size, an MFT entry size, etc.

As the related art related to the recovery of the file system, there is Korean Patent No. 1078289 entitled "method and apparatus for recovery of partition". Korean Patent No. 1078289 discloses a method for searching for information in the existing boot record that is not deleted and recovering a deleted partition based on the searched information. Further, Korean Patent No. 1403305 entitled "apparatus and method for recovery of a partition using backup boot record information" discloses a method for searching for a backup boot record (BBR) backed up in a file system and recovering deleted partition information based on the BBR.

SUMMARY OF THE INVENTION

Accordingly, the present invention has been made keeping in mind the above problems occurring in the prior art, and an object of the present invention is to provide a method and an apparatus for recovery of a partition using data maintaining file or directory information even when data maintaining partition information of a disc, data maintaining volume information, and data maintaining MFT information of a file system are damaged.

Another object of the present invention is to provide a method and an apparatus for calculating attribute values required for recovery of a partition using a predefined MFT entry and a pair of predefined data clusters of the predefined MFT entry.

Another object of the present invention is to provide a method and an apparatus for recovery of a file and a directory that a non-destroyed MFT entry indicates, in a recovered partition.

Another object of the present invention is to provide a method and an apparatus for calculating positions of boot records and sizes of the volume in each of the multi-partitions using a predefined MFT entry and a predefined data cluster and a method and an apparatus for recovery of multi-partitions using the calculated positions of boot records and sizes of the volume.

Another object of the present invention is to provide a method and an apparatus for detecting traces of a malicious code and coping with an intrusion accident, by recovering a layout of a partition using data maintaining file or directory information even when a disc is destroyed by a cyber terror, etc.

Another object of the present invention is to provide a method and an apparatus for recovery of a partition using a multi-processor capable of shortening a search time for even a large-capacity disc or an evidence image.

However, the objects of the exemplary embodiments of the present invention are not limited to the above-mentioned matters and other objects can be clearly understood to those skilled in the art from the following descriptions.

In accordance with an aspect of the present invention to accomplish the above object, there is provided a method for recovery of a file system, including: generating at least one master file table (MFT) entry list in a disc or an evidence image and collecting at least one data cluster candidate; generating at least one MFT entry-data cluster pair candidate using the MFT entry list and the at least one data cluster candidate; determining an attribute value of a virtual partition by analyzing the at least one MFT entry-data cluster pair candidate; and generating the virtual partition based on the attribute value.

The collecting may be performed on a plurality of segmented regions of the disc or the evidence image, respectively, in parallel by a plurality of execution units.

The number of the plurality of execution units may be determined based on a size of the disc or the evidence image and the number of processors of an apparatus for recovery of a file system performing the method for recovery of a file system.

Each MFT entry-data cluster pair candidate of the at least one MFT entry-data cluster pair candidate may be a pair of data cluster candidates satisfying a predefined condition among the MFT entry candidate and the at least one data cluster candidate.

The MFT entry candidate may satisfy the predefined condition among the at least one MFT entry of the MFT entry list.

The MFT entry candidate forming the at least one MFT entry-data cluster pair candidate may be a predefined type of MFT entry.

The predefined type of MFT entry may be the MFT entry that may provide mapping to a physical address from a logical cluster number (LEN) address recorded in the MFT entry.

An MFT entry header of the predefined MFT entry may include a predefined MFT entry header signature.

The collecting may include: determining a position at which data are read in the disc or the evidence image using an MFT minimum generation unit; when an MFT entry is detected at the position, adding the detected MFT entry to the MFT entry list; and before the added MFT entry, when at least one reversely continued MFT is detected, adding the at least one reversely continued MFT entry to the MFT entry list.

The adding of the detected MFT entry to the MFT entry list may include: reading data at the determined position; determining the read data as the MFT entry when a predefined region among the read data has a value of a predefined MFT entry header signature; and if it is determined that the read data are the MFT entry, adding the read data to the MFT entry list as the MFT entry.

The adding further may include moving the position as much as the MFT minimum generation unit.

The predefined condition may be that the MFT entry candidate and the data cluster candidate are data within the same partition.

The generating of the at least one MFT entry-data cluster pair candidate may include: calculating a position of a boot record using a target MFT entry candidate among the at least one MFT entry candidate of the MFT entry list and a target data cluster candidate among the at least one data cluster candidate; determining whether the target MFT entry candidate and the target data cluster candidate are data within the same partition based on the position of the boot record; and if it is determined that the target MFT entry candidate and the target data cluster candidate are data within the same partition, adding a pair of the target MFT entry candidate and the target data cluster candidate to the at least one MFT entry-data cluster pair candidate.

The position of the boot record may be calculated based on a relative position between the target MFT entry candidate and the target data cluster candidate.

The calculating of the position of the boot record may include: acquiring an attribute value of the target MFT entry candidate; acquiring an attribute value of the target data cluster candidate; and calculating the position of the boot record using the attribute value of the target MFT entry candidate and the attribute values of the target data cluster candidate.

The attribute value of the target MFT entry candidate includes an MFT entry file size, an MFT entry file start position cluster offset; and the number of MFT entry file clusters.

The attribute value of the target data cluster may include a current physical sensor offset.

The physical sector offset of the boot record may be calculated based on the current physical sector offset, the MFT entry file start position cluster offset, and the number of bytes per the cluster of the virtual partition.

The number of bytes per the cluster may be determined based on the MFT entry file size and the number of MFT entry file cluster.

The attribute value of the at least one MFT entry may include a directory index size, a directory index start position cluster offset, and the number of directory index clusters of the MFT entry.

The attribute value of the at least one target data cluster candidate may include a physical sector offset of the data cluster candidate.

The attribute value of the virtual partition may include a volume size of the virtual partition.

The volume size may be calculated based on a cluster offset maximum value of the virtual partition and a position of a boot record of the virtual partition.

In accordance with another aspect of the present invention to accomplish the above object, there is provided an apparatus for recovery of a file system, including: a collection unit configured to generate at least one master file table (MFT) entry list in a disc or an evidence image and collect at least one data cluster candidate; an analysis unit configured to generate at least one MFT entry-data cluster pair candidate using the MFT entry list and the at least one data cluster candidate; and a generation unit configured to analyze the at least one MFT entry-data cluster pair candidate to determine an attribute value of a virtual partition and generate the virtual partition based on the attribute value.

In addition, there are further provided another method, apparatus, system, and computer-readable recording medium having a computer program executing the method recorded therein, for implementing the present invention.

BRIEF DESCRIPTION OF THE DRAWINGS

The above and other objects, features and advantages of the present invention will be more clearly understood from the following detailed description taken in conjunction with the accompanying drawings, in which:

FIG. 9A is a flow chart of the method for searching for an MFT entry according to an exemplary embodiment;

FIG. 9B is a flow chart of the method for searching for an MFT entry at a position determined by an MFT minimum generation unit according to an exemplary embodiment;

FIG. 9C is a flow chart of a method for searching for at least one reversely continued MFT entry according to an exemplary embodiment;

FIG. 9D is a flow chart of a method for searching for at least one of MFT entries forward continued according to an exemplary embodiment;

FIG. 10A is a flow chart of a method for reading out data for the search of the data cluster candidate according to an exemplary embodiment;

FIG. 10B is a flow chart of a method for determining whether the data are the data cluster according to an exemplary embodiment;

FIG. 11A is a flow chart of the method for searching for a target MFT entry candidate according to an exemplary embodiment;

FIG. 11B is a flow chart of a method for generating an MFT entry-data cluster pair for a selected target MFT entry candidate according to an exemplary embodiment;

FIGS. 17A and 17B are diagrams illustrating a predefined MFT entry and data of the predefined MFT entry according to an exemplary embodiment;

FIG. 17A is a diagram illustrating the predefined MFT entry according to the exemplary embodiment;

FIG. 17B is a diagram illustrating the data of the predefined MFT entry according to the exemplary embodiment;

FIG. 18 is a diagram illustrating an NTFS boot record according to an exemplary embodiment;

FIG. 19 is a diagram illustrating an MFT entry header structure according to an exemplary embodiment;

FIGS. 20A to 20C are diagrams illustrating an MFT entry attribute header structure according to an exemplary embodiment;

FIG. 20A is a diagram illustrating a portion of the MFT entry attribute header structure according to the exemplary embodiment;

FIG. 20B is a diagram illustrating a resident attribute of the MFT entry attribute header structure according to the exemplary embodiment;

FIG. 20C is a diagram illustrating a non-resident attribute of the MFT entry attribute header structure according to the exemplary embodiment;

FIG. 21 is a diagram illustrating a structure an MFT entry list according to an exemplary embodiment;

FIG. 22 is a diagram illustrating a structure of at least one MFT entry candidate according to the exemplary embodiment; and FIG. 23 is a diagram illustrating a structure of at least one data cluster candidate according to the exemplary embodiment.

DESCRIPTION OF THE PREFERRED EMBODIMENTS

Figure 1:
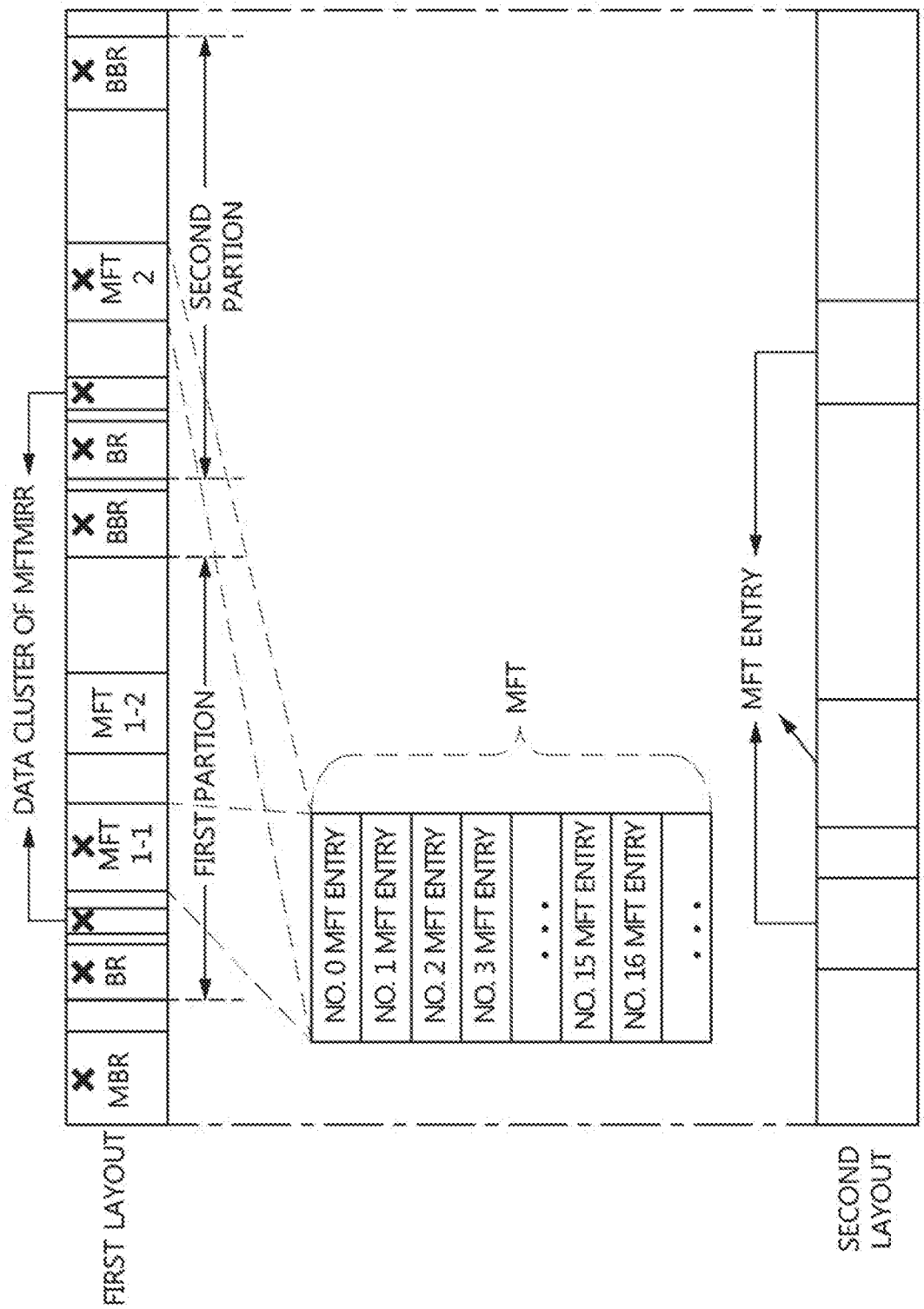
FIG. 1 is a diagram illustrating a situation that it is difficult to recover a disc, according to an exemplary embodiment.

Exemplary embodiments of the present invention will be described in detail with reference to the accompanying drawings. These embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present disclosure will be described in detail with reference to the accompanying drawings so that those skilled in the art may easily practice the present disclosure.

Hereinafter, the terms "volume" and "partition" may be used as the same or similar meaning and may be compatible with each other.

FIG. 1 is a diagram illustrating a situation that it is difficult to recover a disc, according to an exemplary embodiment.

As described in FIG. 1, MBR, BR, BBR, and MFT that are core information for recovery of a disc are damaged in the disc.

As a partition of the disc, a first partition and a second partition are illustrated. The two partitions may each be an NTH partition.

In FIG. 1, a region represented by "X" among the regions of the disc may indicate a destroyed region.

As illustrated in a first layout of FIG. 1, core information on a configuration of the partition of the disc such as MBR, GPT, BR, and BBR is destroyed. Further, a $MFT metadata file (No. 0 MFT entry) and a $MFTMirr metadata file (No. 1 MFT entry) maintaining file information are destroyed. When the core information and/or the metadata are destroyed, it may be difficult to recover the partition.

As described above, there are two NTFS partitions before the disc is destroyed. In the first partition, segmented MFTs are each present in two regions. In the first partition, an MFT 1-1 and an MFT 1-2 indicate the segmented MFTs. On the other hand, in the second partition, the MFT is present in one region. In the second partition, the MFT 2 indicates the stored MFT.

Due to the destruction of the disc, like the first layout, all of the MBR, the BR, the BBR, the $MFT metadata file (No. 0 MFT entry) and the $MFTMirr metadata file (No. 1 MFT entry) are destroyed.

As illustrated in a second layout, when only a portion of the MFT entry is present, the partitions of the disc may be hardly recovered only by the existing forensics tool.

Even under the situation as illustrated in the second layout, it is possible to recover the disc damaged due to a malicious code and cope with an intrusion only when the partitions of the disc and the remaining files need to be recovered.

Hereinafter, according to the exemplary embodiment, even under the situation in which the MBR and the GPT are deleted and the BR, the BBR, the $MFT metadata and the $MFTMirr metadata file are deleted, a method for recovering a partition and a file will be described using a pair of data clusters of the remaining MFT entries and the MFT entry.

Figure 2:
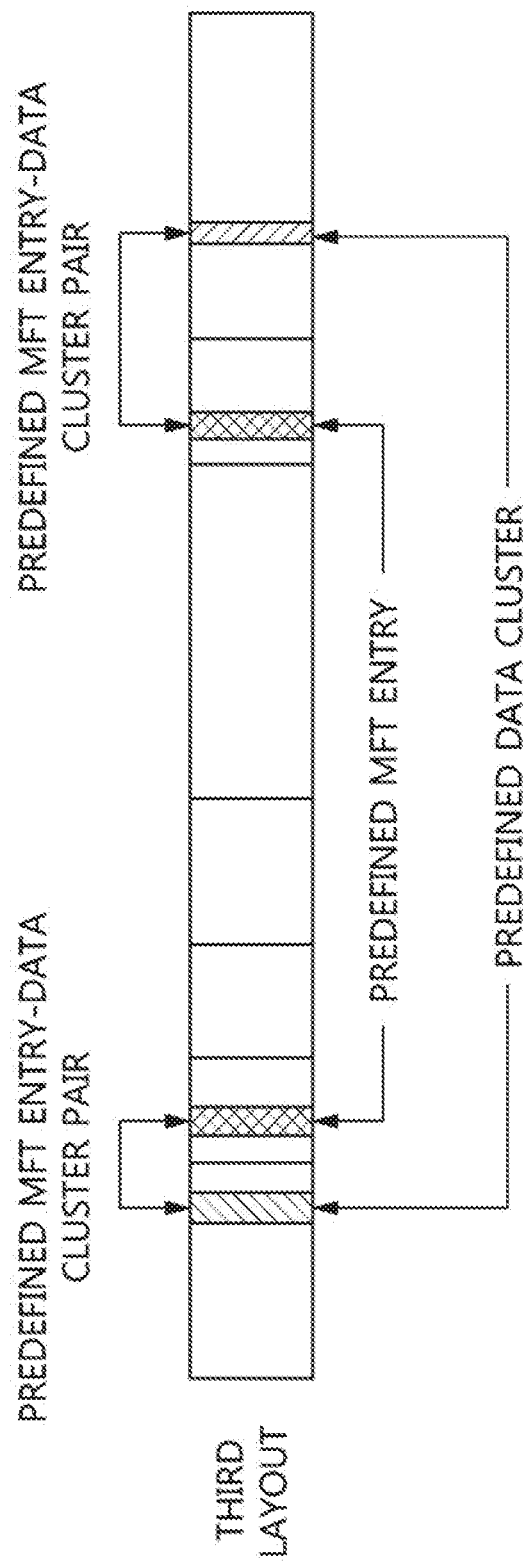
FIG. 2 is a diagram illustrating data used for recovery of a partition according to an exemplary embodiment.

FIG. 2 is a diagram illustrating data used for recovery of a partition according to an exemplary embodiment.

In an exemplary embodiment to be described below, even under the situation that the $MFT metadata file and the $MFTMirr metadata file as well as the MBR, the GPT, the BR, and the BBR are also destroyed or deleted, a method and an apparatus for recovery of a partition and a file based on an MFT entry and a data cluster of the MFT entry are disclosed. Here, the $MFT metadata file and the $MFTMirr metadata file may be one example of layout information of the MFT entry.

As it were, in the exemplary embodiment to be described below, information related to a configuration of the partition is destroyed and thus an access to the file of the partition may not be made and when the situation that the $MFT metadata file and the $MFTMirr metadata file that are the core information of the MFT are destroyed is assumed, a method and an apparatus for reconfiguring a virtual partition using an MFT entry maintaining individual file information of an NTFS file system under the situation and a data cluster of the MFT entry are disclosed. The file of the virtual partition may be recovered by the reconfiguration of the virtual partition.

The virtual partition to be recovered may be plural. As it were, in the exemplary embodiment to be described below, an object of the reconfiguration may be the virtual partitions.

As illustrated in a third layout, a predefined MFT entry and a predefined data cluster of the predefined MFT entry may be searched in a disc or an evidence image to reconfigure the virtual partition.

The predefined MFT entry may be an MFT entry defined by an analyzer, etc., to reconfigure the virtual partition. The predefined MFT entry may be an MFT entry in which a predefined signature is secured. The signature may be used to identify the MFT entry that will be used to reconfigure the virtual partition in the disc or the evidence image. The signature may be different for each MFT entry.

The predefined MFT entry may be defined for the MFT entry of the file and the MFT entry of the directory, respectively. The signature of the predefined MFT entry indicating the file and the signature of the predefined MFT entry indicating the directory may each be defined differently.

The predefined data cluster may be actual data or an index record of the file or the directory that the predefined MFT entry indicates. The predefined data cluster may be a data cluster in which the signature is secured. The signature may be used to identify the data cluster that will be used to reconfigure the virtual partition in the disc or the evidence image. The signature may be different for each data cluster.

In the third layout, the predefined MFT entry and the data cluster of the predefined MFT entry are illustrated as an MFT entry-data cluster pair.

Figure 3:
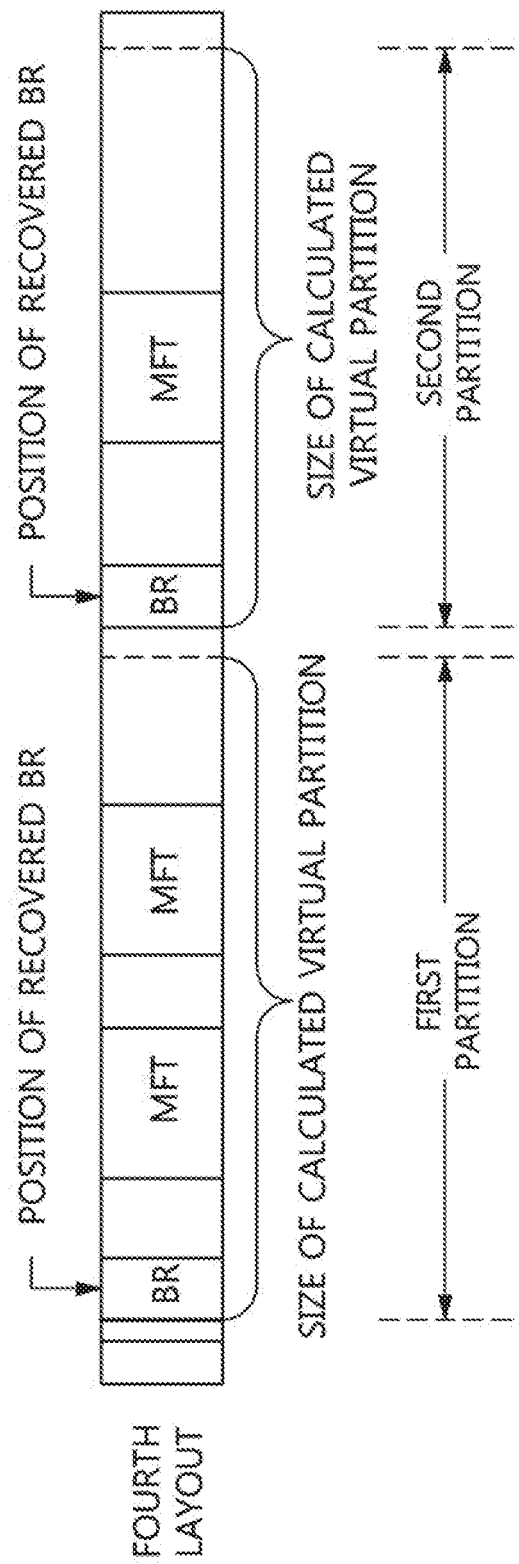
FIG. 3 is a diagram illustrating a principle of recovery of a virtual partition and results of the recovery according to an exemplary embodiment.

FIG. 3 is a diagram illustrating a principle of recovery of a virtual partition and results of the recovery according to an exemplary embodiment.

The file of the virtual partition to be reconfigured may be confirmed by verification on the MFT entry and the data cluster. Further, an attribute value of the virtual partition to be reconfigured may be calculated by using the MFT entry and the data cluster.

For example, the attribute value of the virtual partition may include a position of a boot record of the virtual partition, a cluster size of the virtual partition, a volume size of the virtual partition, and the like. The volume size of the virtual partition may represent a total number of sectors of the virtual partition.

The layout of the destroyed partition may be recovered based on the attribute value of the virtual partition. Further, the virtual partition may be generated by the recovery of the layout.

In the following exemplary embodiment, the virtual partition generated by the foregoing scheme may be briefly described as an MFT entry virtual partition (MVP).

Generally, the file or the directory in the file system may be configured of a metadata region and a cluster region. The metadata region may be a region in which attribute values of the file and the directory are present. Hereinafter, the terms "attribute value" and "attribute information" may be used as the same meaning. The cluster region may be a region in which actual data of the file and the directory are present.

In the case of the NTFS file system, the metadata region may be configured of the attribute values within the MFT entry. Further, the data region may be managed by a cluster data run list of a "$Data" attribute value.

In the exemplary embodiment to be described below, the partition of the NTFS file system may be recovered to the virtual partition based on the actual data cluster that the metadata and the cluster data run list indicate. As it were, the attribute values of the partition may be determined based on the MFT entry and the virtual partition may be generated based on the attribute values.

As illustrated in a fourth layout, a size of the virtual partition for the first partition is calculated and a size of the virtual partition for the second partition is calculated. Further, a position of a BR of the first partition and a position of a BR of the second partition are recovered virtually. The recovered position of the BR of the first partition may be at a position at which the first partition starts. The recovered position of the BR of the second partition may be at a position at which the second partition starts. Further, two MFT entry groups searched within the first partition may be identified and one MFT entry group searched within the second partition may be identified.

Figure 4:
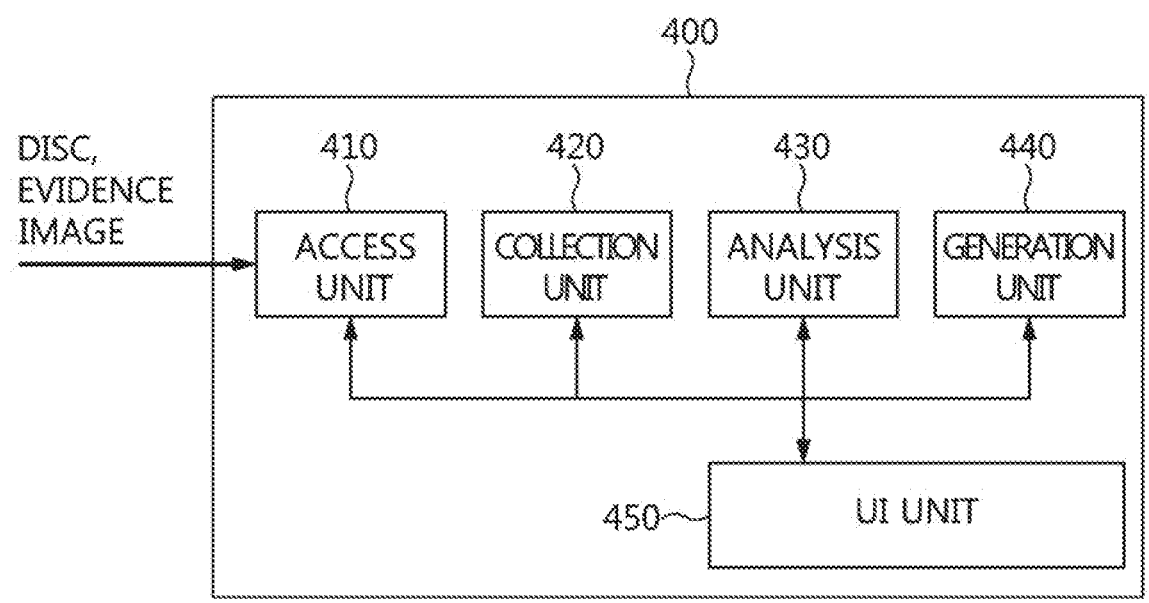
FIG. 4 is a structure diagram of an apparatus for recovery of a file system according to an exemplary embodiment.

FIG. 4 is a structure diagram of an apparatus for recovery of a file system according to an exemplary embodiment.

An apparatus 400 for recovery of a file system may include an access unit 410, a collection unit 420, an analysis unit 430, a generator unit 440, and a user interface (UI) unit 450.

The access unit 410 may perform an access to a data source of a digital forensic. An input of the access unit 410 may be the disc or the evidence image. The access unit 410 may perform the access to the disc or the evidence image.

Since the apparatus 400 for recovery of a file system may be operated under the situation that the disc is destroyed, the access unit 410 may read the whole evidence image. The access unit 410 may read some of all the data of the disc or the evidence image. Some data may be data which may be read among all the data.

The data from the disc or the evidence image to be described below may be read by the access unit 410.

The collection unit 420 may collect at least one MFT entry and at least one data cluster candidate in the disc or the evidence image.

The collection unit 420 may collect at least one MFT entry to generate an MFT entry list.

The collection unit 420 may collect at least one MFT entry and at least one data cluster candidate from the data read by the access unit 410.

For example, the MFT entry list may be stored in a form of a continued list that represents the MFT entry in a unit of 1024 bytes. At least one MFT entry may be included in the MFT entry list.

The collection unit 420 may collect at least one MFT entry-data cluster pair candidate from the disc or the evidence image.

The MFT entry list may be information indicating at least one MFT entry searched in the disc or the evidence image or the searched at least one MFT entry. At least one data cluster candidate may be information indicating at least one data cluster searched in the disc or the evidence image or the searched at least one data cluster.

The MFT entry list may be generated by searching for the MFT entry. At least one MFT entry may be included in the MFT entry list. Further, the data cluster candidate may be generated by searching for the data cluster. The data cluster candidate to be searched may be a data cluster corresponding to the predefined MFT entry. The predefined MFT entry may include the predefined MFT entry signature. The data cluster candidate may include the predefined data cluster signature.

The analysis unit 430 may use at least one MFT entry and at least one data cluster candidate within the MFT entry list to generate at least one MFT entry-data cluster pair candidate.

Each MFT entry-data cluster pair candidate of at least one MFT entry-data cluster pair candidate may be the MFT entry and a pair of data clusters of the MFT entry. Alternatively, each MFT entry-data cluster pair candidate may be information indicating the MFT entry and the pair of data clusters of the MFT entry.

For example, the MFT entry-data cluster pair candidate may be valid information which may be used to recover the partition among the collected at least one MFT entry and at least one data cluster candidate that are present in the MFT entry list.

The MFT entry-data cluster pair candidate may also be named MVP candidate information.

The MFT entry candidate forming the MFT entry-data cluster pair candidate may be the predefined type of MFT entry. The analysis unit 430 may search for the predefined type of MFT entry in at least one MFT entry list. The MFT analysis unit 430 may perform matching with the data cluster candidate for the predefined type of MFT entry among at least one MFT entry.

The predefined type of MFT entry may be the MFT entry that may provide mapping to a physical address from a logical cluster number (LCN) address recorded in the MFT entry. The layout of the partition may be recovered by the mapping.

Each MFT entry-data cluster pair candidate of at least one MFT entry-data cluster pair candidate may be the pair of MFT entry candidate and data cluster candidate satisfying the predefined condition among at least one MFT entry and at least one data cluster candidate that are present within the MFT entry list.

For example, the predefined condition may be that the MFT entry candidate and the data cluster candidate are data within the same partition. Before the disk is destroyed, the multi-partitions may also be configured in the disc. When the multi-partitions are configured in the disc, the same MFT entries having the same signature and the data clusters having the same signature may be present in the disc or the evidence image. Therefore, the pair of MFT entry from which information on the partition to be generated may be extracted and data cluster needs to be identified.

As it were, if it is determined that any MFT entry and any data cluster candidate are data within different partitions, the MFT entry and the data cluster candidate may not form the MFT entry-data cluster pair.

The analysis unit 430 may perform the matching of at least one MFT entry and at least one data cluster candidate that are present within the MFT entry list. For example, to determine whether a specific MFT entry and a specific data cluster are the data within the same partition, the analysis unit 430 may use the MFT entry and the data cluster candidate to calculate the position of the boot record of the virtual partition. The analysis unit 430 may determine whether the MFT entry and the data cluster candidate are the data within the same partition based on the calculated position of the boot record. If it is determined that the MFT entry and the data cluster candidate are the data within the same partition, the analysis unit 430 may generate the MFT entry-data cluster pair candidate of the MFT entry and the data cluster candidate.

Further, the analysis unit 430 may analyze the MFT entry and the data cluster candidate to calculate the position of the boot record. The values acquired by the analysis may be used the basic information to analyze the disc or the evidence image and may be used as the attribute value of the virtual partition to be generated.

The generation unit 440 may determine the attribute value of the virtual partition by analyzing at least one MFT entry-data cluster pair candidate. The virtual partition may be the MVP.

The attribute value of the virtual partition may be a value or information required to require the layout of the partition to be recovered. As it were, the attribute value of the virtual partition may be the core information capable of reconfiguring the layout of the virtual partition corresponding to the damaged partition.

For example, the attribute value may include the position of the BR of the virtual partition in the disc or the evidence image. Further, for example, the attribute value may include the volume size of the virtual partition. The attribute value may include the cluster size of the virtual partition and the MFT entry size of the virtual partition.

The generation unit 440 may use the attribute value of the virtual partition to configure the virtual boot record and may generate the volume information of the virtual partition.

The generated virtual partition may be one or more. For each virtual partition of at least one virtual partition, the attribute value of the virtual partition may be used to generate the virtual partition.

To generate at least one virtual partition, at least one virtual partition candidate information may be used. The virtual partition candidate information may include information required to generate the virtual partition. For example, the virtual partition candidate information may include the attribute value of the virtual partition.

The generation unit 440 may generate the virtual partition based on the attribute value of the virtual partition. Further, the generation unit 440 may use the MFT entry list generated by the collection unit 420 to generate the tree structure of the file system of the virtual partition. The generation unit 440 may parse at least one MFT list of the MFT entry list in a file unit to generate the tree structure of the file system.

Alternatively, the generation unit 440 may generate the virtual partition based on the virtual partition candidate information or the attribute value of the virtual partition included in the virtual partition candidate information.

The generation unit 440 may add the virtual partition to apparatus 400 for recovery of a file system or a computer.

The UI unit 450 may provide a UI required for the operation of the apparatus 400 for recovery of a file system.

A user of the apparatus 400 for recovery of a file system or the computer may investigate the virtual partition by the UI and may investigate the file of the virtual partition.

Exemplary functions and operations of the access unit 410, the collection unit 420, the analysis unit 430, the generation unit 440, and the UI unit 450 will be described below in more detail.

The apparatus 400 for recovery of a file system may use the predefined MFT entry and the predefined data cluster within the disc or the evidence image to recover the virtual partition and may recover by parsing the MFT entry. Further, the apparatus 400 for recovery of a file system may recover the disc or the evidence image even under the situation that the MBR, the GPT, the BR, the BBR, etc., of the disc or the evidence image are damaged and the $MFT metadata file and the $MFTMirr metadata file maintaining the basic information of the file are absent. Here, the MBR and the GPT may be an example of the data maintaining the partition information of the disc. The BR and the BBR may be an example of the data maintaining the volume information. Here, the $MFT metadata file and the $MFTMirr metadata file may be one example of metadata maintaining the MFT information of the MFT entry of the NTFS file system. The MFT entry may be an example of data maintaining information of an individual file or an individual directory FIG. 5 is a diagram illustrating an electronic apparatus for implementing the apparatus for recovery of a file system according to the exemplary embodiment.

Figure 5:
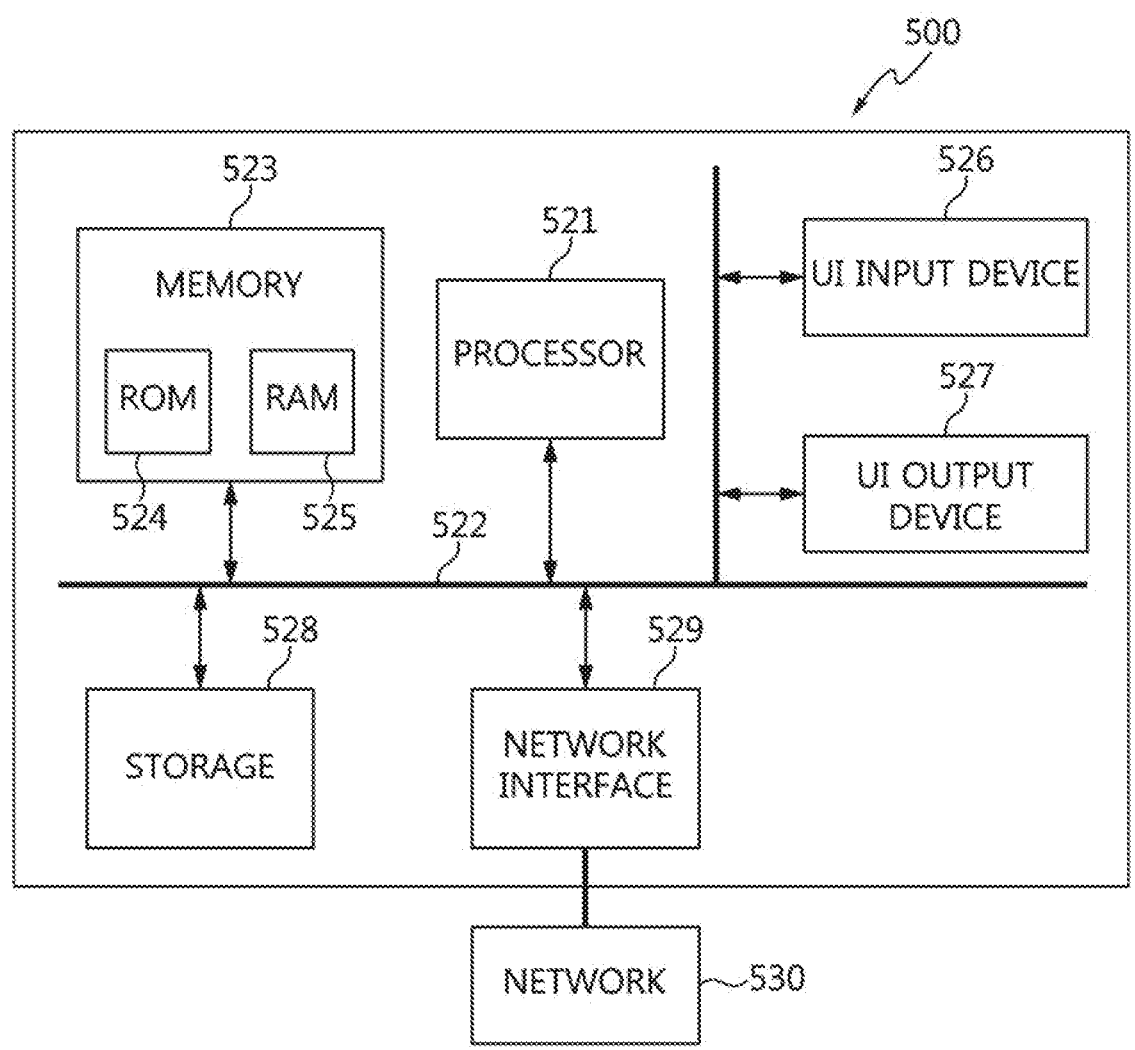
FIG. 5 is a diagram illustrating an electronic apparatus for implementing the apparatus for recovery of a file system according to the exemplary embodiment.

The apparatus 400 for recovery of a file system may be implemented as an electronic apparatus 500 illustrated in FIG. 5. The electronic apparatus 500 may be a general-purpose computer system which provides a function or an operation of the apparatus 400 for recovery of a file system.

As illustrated in FIG. 5, the electronic apparatus 500 may include a processor 521, a memory 523, a user interface (UI) input device 526, an UI output device 527, and a storage 528, all of which communicate with each other via a bus 522. Further, the electronic apparatus 500 may further include a network interface 529 connected to a network 530.

The processor 521 may be a semiconductor apparatus executing processing instructions that are stored in a central processing unit (CPU), the memory 523, or the storage 528. The memory 523 and the storage 528 may include various types of volatile or nonvolatile storage media. For example, the memory may include at least one of ROM 524 and RAM 525.

The electronic apparatus 500 for implementing the apparatus 400 for recovery of a file system may include a recording medium that may be read by a computer. The recording medium may be stored in the memory 523 or the storage 528 as at least one module. At least one module stored in the storage 528 may move to the memory 523 to be executed by the processor 521. At least one module of the apparatus 400 for recovery of a file system may be stored in the memory 523 and may be configured to be executed by the processor 521.

The memory 523 or the storage 528 may store the evidence image to be recovered. Further, the storage 528 may include the disc to be recovered. As it were, at least a portion of the storage 528 may be an object to be recovered.

The UI input device 526 may receive a required input through the UI. The UI output device 527 may output an UI that is provided to the UI unit 450.

The memory 523 or the storage 528 may store a log for the recovery of the file system and results of the recovery of the file system. The storage 528 may store the log for the recovery of the file system and the results of the recovery of the file system as a file form.

A function associated with communications of data or information of the apparatus 400 for recovery of a file system may be performed through the network interface 529.

Figure 6:
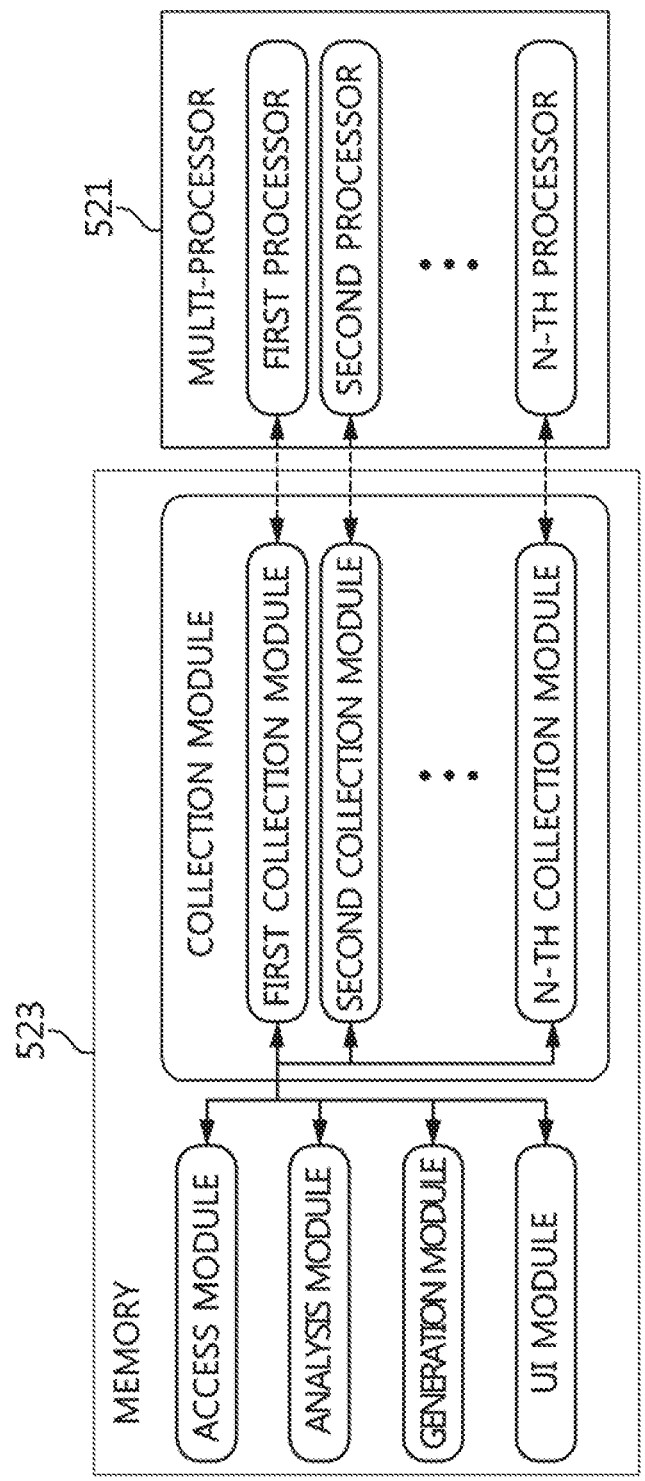
FIG. 6 is a diagram describing at least one module for the recovery of a file system according to the exemplary embodiment.

FIG. 6 is a diagram describing at least one module for the recovery of a file system according to the exemplary embodiment.

The processor 521 of the electronic apparatus 500 may be a multi-processor. For example, the processor 521 may be plural. Alternatively, the processor 521 may include a plurality of cores. FIG. 6 illustrates n processors of a first processor to an n-th processor. n may be an integer equal to or more than 1.

As illustrated in FIG. 6, at least one module may be loaded into the memory 523.

At least one module may include an access module, a collection module, an analysis module, a generation module, and an UI module.

The access module may correspond to the access unit 410 described with reference to FIG. 4. As it were, a function or an operation described as being executed by the access unit 410 may be performed by the access module.

The collection module may correspond to the collection unit 420 described with reference to FIG. 4. As it were, a function or an operation described as being executed by the collection unit 420 may be performed by the collection module.

The collection module may be plural. The plurality of collection modules may each be performed by a plurality of processors. For example, the plurality of collection modules may be a plurality of threads. FIG. 6 illustrates n collection modules of a first collection module to an n-th collection module.

The number of the plurality of collection modules may be defined to meet the number of the plurality of processors. For example, the number of the plurality of collection modules may equal to that of the plurality of processors. The plurality of collection modules may each be allocated to the plurality of processors. As the plurality of collection modules are each be allocated to the plurality of processors, the plurality of collection modules may be simultaneously performed in parallel by the plurality of processors. The plurality of processors may be executed in a multi-thread form by the plurality of collection modules.

The analysis module may correspond to the analysis unit 430 described with reference to FIG. 4. As it were, a function or an operation described as being executed by the analysis unit 430 may be performed by the collection module.

The generation module may correspond to the generation unit 440 described with reference to FIG. 4. As it were, a function or an operation described as being executed by the generation unit 440 may be performed by the generation module.

The UI module may correspond to the UI unit 450 described with reference to FIG. 4. As it were, a function or an operation described as being executed by the UI unit 450 may be performed by the access module.

At least a portion of at least one module may communicate with external apparatuses or systems. The modules may be performed by the processor 521 in a form of an operating system, an application module, a library, and other program modules. Further, at least a portion of at least one module may be stored in known storage apparatuses in addition to the memory 523 and the storage 528 and may also be stored in a remote storage apparatus which may communicate with the electronic apparatus 500.

At least one module may include a routine, a subroutine, a program, an object, a component, a data structure, etc., that may execute functions or operations to be described below or implement an abstract data type to be described below, but is not limited thereto. At least one module may be configured of instructions or codes that are executed by the processor 521.

Figure 7:
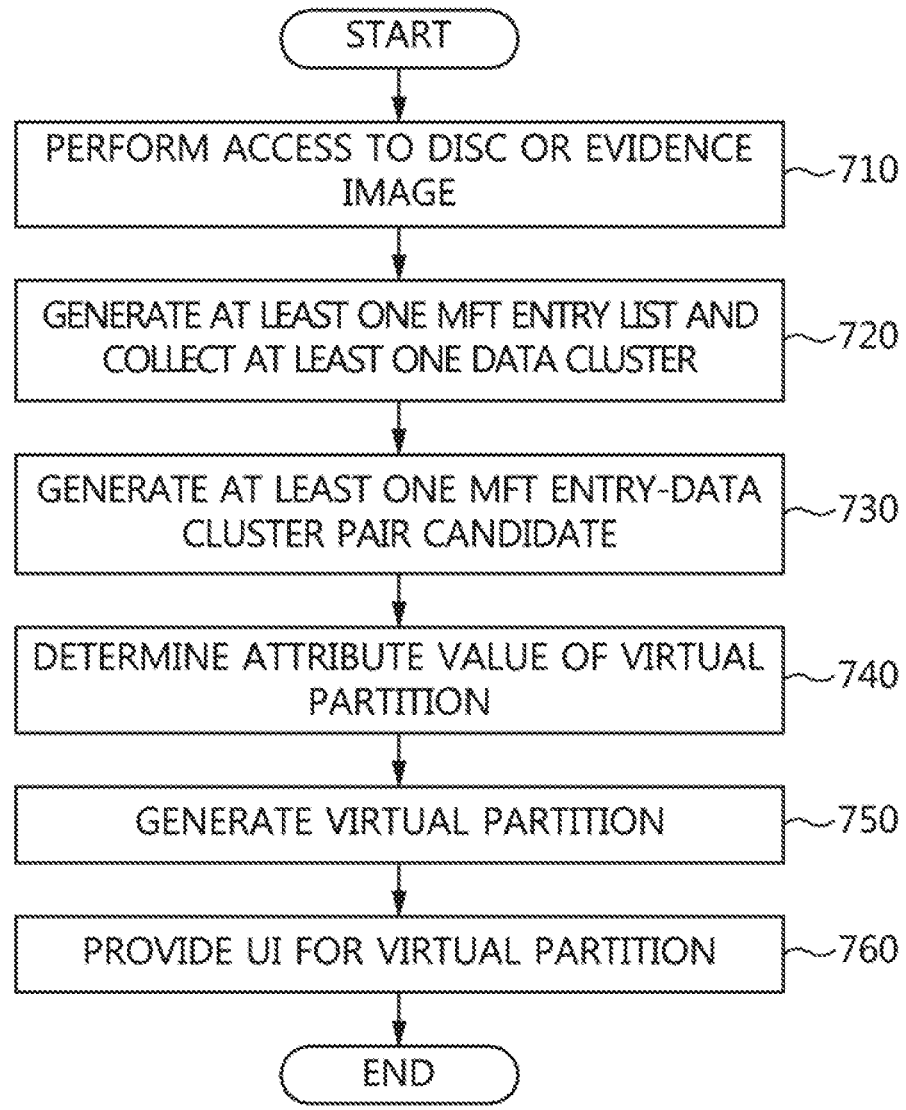
FIG. 7 is a flow chart of a method for recovery of a file system according to an exemplary embodiment.

FIG. 7 is a flow chart of a method for recovery of a file system according to an exemplary embodiment.

The recovery of the partition may be performed through steps 710, 720, 730, 740, and 750 to be described below.

In the step 710, the access unit 410 may perform an access to a data source of digital forensics.

The data source may be the disc or the evidence image to be investigated or searched. The evidence image may be an image of a predefined format. For example, the predefined format may be a DD format or an expert witness compression format (EWF).

The access unit 410 may read data from the disc or the evidence image by the access.

Since the apparatus 400 for recovery of a file system may be operated under the situation that the disc is destroyed, the access unit 410 may read the whole evidence image. The access unit 410 may read some of all the data of the disc or the evidence image. Some data may be data which may be read among all the data.

In the step 720, the collection unit 420 may generate the MFT entry list in the disc or the evidence image and collect at least one data cluster candidate.

The collection unit 420 may collect at least one MFT entry to generate the MFT entry list. As it were, the MFT entry list may include the collected at least one MFT entry.

The collection unit 420 may collect at least one MFT entry and at least one data cluster candidate from the data read by the access unit 410.

For example, the MFT entry list may be represented by one structure when the MFT entries in a unit of 1024 bytes are continuously present. Further, the MFT entry candidate to be described below may be included in the MFT entry list.

The collection unit 420 may collect at least one MFT entry and at least one data cluster candidate based on the signature, as the whole of the disc or the evidence image as an object.

The MFT entry list may be information indicating at least one MFT entry searched in the disc or the evidence image or the searched at least one MFT entry. At least one data cluster candidate may be information indicating at least one data cluster searched in the disc or the evidence image or the searched at least one data cluster.

The MFT entry list may be generated by searching for the MFT entry. Further, the data cluster candidate may be generated by searching for the data cluster. The data cluster candidate to be searched may be a data cluster corresponding to the predefined MFT entry.

The collection unit 420 may use the predefined data cluster signature for the collection of the data cluster candidate of the MFT entry. The predefined MFT entry may include the predefined. MFT entry signature. The data cluster candidate may include the predefined data cluster signature. Alternatively, the predefined MFT entry may be data including the predefined MFT entry signature. The data cluster candidate may include data including the predefined data cluster signature.

As described above, the processor 521 of the electronic apparatus 500 may be plural and the collection module may be plural. The collection unit 420 may generate the MFT entry list from the disk or the evidence image and may operate a plurality of execution units to collect at least one data cluster candidate. For example, the execution unit may be at least one of the thread, the process, etc.

The collection unit 420 may segment the region of the large-capacity disc or the evidence image based on the multi-processor. The collection unit 420 may use the plurality of execution unit for the plurality of segmented regions of the disc or the evidence image to generate the MFT entry list and collect at least one data cluster candidate. Further, at least a portion of the step 720 may each be performed in parallel by the plurality of execution units for the plurality of segmented regions of the disc or the evidence image.

A method for generating an MFT entry list and collecting at least one data cluster candidate according to an exemplary embodiment will be described with reference to FIG. 8.

In the step 730, the analysis unit 430 may use at least one MFT entry and at least one data cluster candidate within the MFT entry list to generate at least one MFT entry-data cluster pair candidate.

Each MFT entry-data cluster pair candidate of at least one MFT entry-data cluster pair candidate may be the MFT entry and a pair of data clusters of the MFT entry. Alternatively, each MFT entry-data cluster pair candidate may be information indicating the MFT entry and the pair of data clusters of the MFT entry.

For example, the MFT entry-data cluster pair candidate may be the valid information which may be used to recover the partition among the collected at least one MFT entry and at least one data cluster candidate. The MFT entry-data cluster pair candidate may also be named MVP candidate information.

The MFT entry candidate forming the MFT entry-data cluster pair candidate may be the predefined type of MFT entry. The analysis unit 430 may search for at least one MFT entry candidate that is the predefined type of MFT entry in the MFT entry list. The MFT analysis unit 430 may perform matching with the data cluster candidate for the predefined type of MFT entry among at least one MFT entry.

The predefined type of MFT entry may be the MFT entry that may provide mapping to a physical address from a logical cluster number (LCN) address recorded in the MFT entry. The layout of the partition may be recovered by the mapping.

Each MFT entry-data cluster pair candidate of at least one MFT entry-data cluster pair candidate may be the pair of MFT entry candidate and data cluster candidate satisfying the predefined condition among at least one MFT entry and at least one data cluster candidate.

For example, the predefined condition may be that the MFT entry candidate and the data cluster candidate are data within the same partition. As it were, if it is determined that the MFT entry and the data cluster candidate are data within different partitions, the MFT entry and the data cluster candidate may not form the MFT entry-data cluster pair.

The analysis unit 430 may perform the matching of at least one MFT entry and at least one data cluster candidate. For example, to determine whether a specific MFT entry and a specific data cluster are the data within the same partition, the analysis unit 430 may use the MFT entry and the data cluster candidate to calculate the position of the boot record of the virtual partition. The analysis unit 430 may determine whether the MFT entry and the data cluster candidate are the data within the same partition based on the calculated position of the boot record. If it is determined that the MFT entry and the data cluster candidate are the data within the same partition, the analysis unit 430 may generate the MFT entry-data cluster pair candidate of the MFT entry and the data cluster candidate.

Further, the analysis unit 430 may analyze the MFT entry and the data cluster candidate to calculate the position of the boot record. The values acquired by the analysis may be used the basic information to analyze the disc or the evidence image and may be used as the attribute value of the virtual partition to be generated.

The method for generating an MFT entry-data cluster pair candidate according to the exemplary embodiment of the present invention will be described below with reference to FIGS. 11A to 11D.

In the step 740, the generation unit 440 may determine the attribute value of the virtual partition by analyzing at least one MFT entry-data cluster pair candidate. The virtual partition may be the MVP.

The attribute value of the virtual partition may be a value or information required to require the layout of the partition to be recovered. As it were, the attribute value of the virtual partition may be the core information capable of reconfiguring the layout of the virtual partition corresponding to the damaged partition.

For example, the attribute value may include the position of the BR of the virtual partition in the disc or the evidence image. Further, for example, the attribute value may include the volume size of the virtual partition. The attribute value may include the cluster size of the virtual partition and the MFT entry size of the virtual partition.

The generation unit 440 may use the attribute value of the virtual partition to configure the virtual boot record and may generate the volume information of the virtual partition.

The generated virtual partition may be one or more. For each virtual partition of at least one virtual partition, the attribute value of the virtual partition may be used to generate the virtual partition.

To generate at least one virtual partition, at least one virtual partition candidate information may be used. The virtual partition candidate information may include information required to generate the virtual partition. For example, the virtual partition candidate information may include the attribute value of the virtual partition.

Alternatively, the generation unit 440 may generate the virtual partition based on the virtual partition candidate information or the attribute value of the virtual partition included in the virtual partition candidate information.

The method for generating virtual partition candidate information according to the exemplary embodiment will be described below with reference to FIG. 14.

In the step 750, the generation unit 440 may generate the virtual partition based on the attribute value of the virtual partition. Further, the generation unit 440 may use the MFT entry list generated by the collection unit 420 to generate the tree structure of the file system of the virtual partition. The generation unit 440 may parse at least one MFT entry of the MFT entry list in a file unit to generate the tree structure of the file system.

The generation unit 440 may add the virtual partition to the apparatus 400 for recovery of a file system or a computer.

The method for generating a virtual generation according to an exemplary embodiment ill be described below with reference to FIG. 16.

In the step 760, the UI unit 450 may provide the UI for the virtual partition.

A user of the apparatus 400 for recovery of a file system or the computer may investigate the virtual partition by the UI and may investigate the file of the virtual partition.

By the foregoing steps 710, 720, 730, 740, 750, and 760, the apparatus 400 for recovery of a file system may recover the disc or the evidence image even under the situation that the MBR, the GPT, the BR, the BBR, etc., of the disc or the evidence image are damaged and the $MFT metadata file and the $MFTMirr metadata file maintaining the basic information of the file are absent. The apparatus 400 for recovery of a file system may use the predefined MFT entry and the predefined data cluster within the disc or the evidence image to recover the virtual partition and may recover by parsing the file by parsing at least one MFT entry of the MFT entry list.

Figure 8:
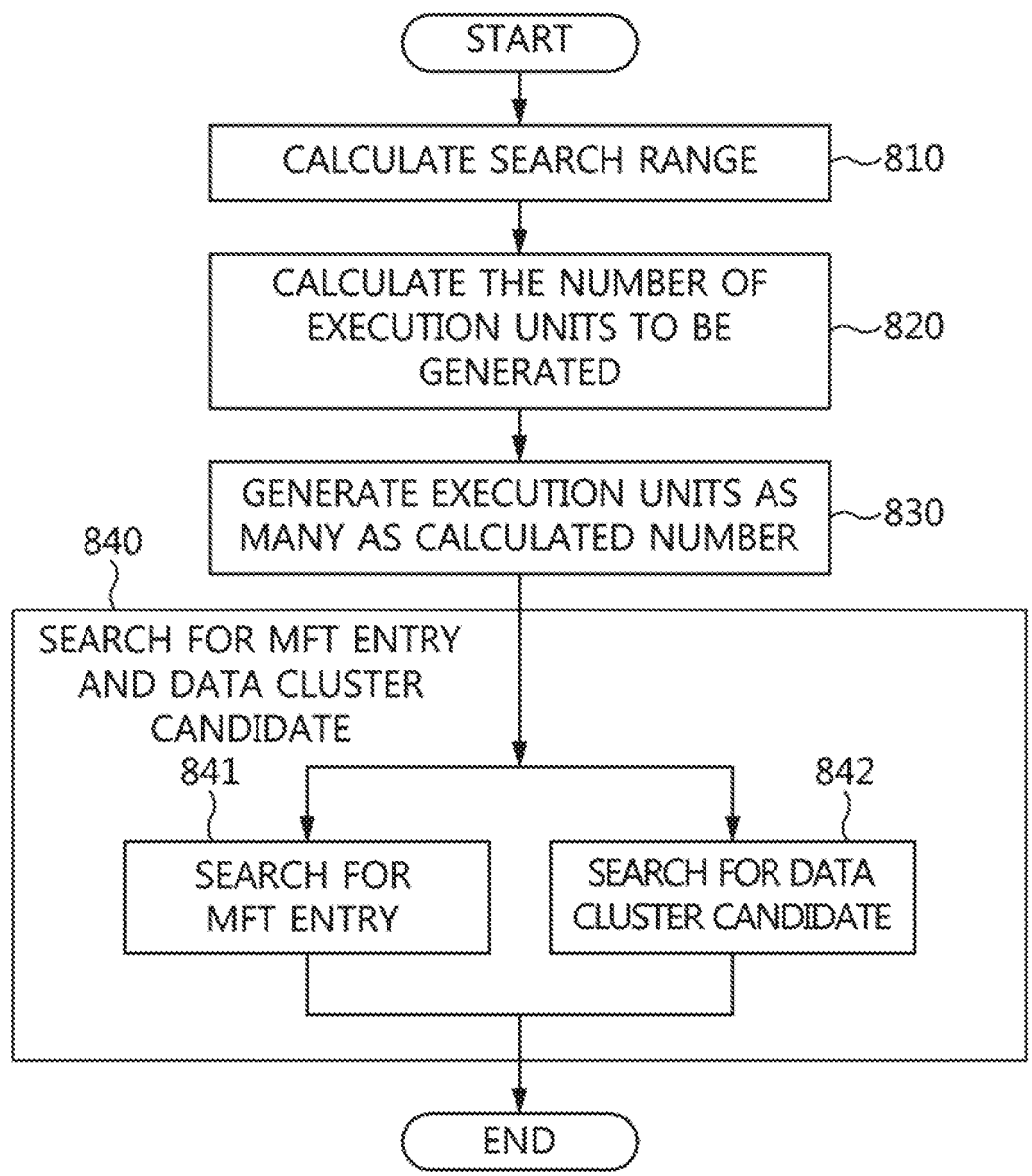
FIG. 8 is a flow chart of a method for generating an MFT entry list and collecting at least one data cluster candidate according to an exemplary embodiment.

FIG. 8 is a flow chart of a method for generating an MFT entry list and collecting at least one data cluster candidate according to an exemplary embodiment.

The step 720 described with reference to FIG. 7 may include at least a portion of steps 810, 820, 830, and 840 to be described below.

In the step 810, the apparatus 400 for recovery of a file system or the collection unit 420 may calculate a search range for at least one MFT entry-data cluster pair candidate.

The search range may indicate the size of the disc or the size of the evidence image.

In the step 820, the apparatus 400 for recovery of a file system or the collection unit 420 may determine the number of execution units to be generated.

The apparatus 400 for recovery of a file system or the collection unit 420 may determine the number of the plurality of execution units based on the size of the disc or the evidence image and the number of processors of the apparatus 400 for recovery of a file system. For example, the number of the plurality of execution units may be equal to or less than the number of processors. Alternatively, the number of the plurality of execution units may be a multiple of the number of processors.

The apparatus 400 for recovery of a file system or the collection unit 420 may determine the number of the plurality of execution units so that a separate execution unit is allocated to the search for at least one MFT entry and the search for at least one data cluster candidate, respectively. As it were, the execution unit may be classified into an execution unit for search of the MFT entry list and an execution unit for search of the data cluster candidate.

For example, for the computer having 1 terabyte (TB) disc and two processors, if the disc of 500 gigabytes (GB) or the evidence image is searched, the search may be performed by a total four of threads. When the apparatus 400 for recovery of a file system or the collection unit 420 generates four threads, each of the four threads may search for one the MFT entry and the data cluster candidate.

In the step 830, the apparatus 400 for recovery of a file system or the collection unit 420 may generate the number of execution units as many as the determined number.

In the step 840, the collection unit 420 may generate at least one MFT entry list and at least one data cluster candidate in the disc or the evidence image.

The step 840 may include steps 841 and 842.

In the step 841, the collection unit 420 may search for at least one MFT entry in the disc or the evidence image.

The method for searching for at least one MFT entry according to the exemplary embodiment will be described below with reference to FIGS. 9A to 9D.

In the step 842, the collection unit 420 may search for at least one data cluster candidate in the disc or the evidence image.

The method for searching for a data cluster candidate according to an exemplary embodiment will be described with reference to FIGS. 10A and 10B.

The steps 841 and 842 may be performed in parallel by the plurality of execution units generated in the step 830. For example, the steps 841 and 842 may each be performed by the separate execution unit. For the plurality of different regions of the disc or the evidence image, the search for at least one MFT entry of the step 841 may each be performed by the plurality of execution units. Further, for the plurality of different regions of the disc or the evidence image, the search for the data cluster candidate of the step 842 may be performed by the plurality of execution units.

FIGS. 9A to 9D are flow charts of a method for searching for an MFT entry list according to an exemplary embodiment.

Figure 9A:
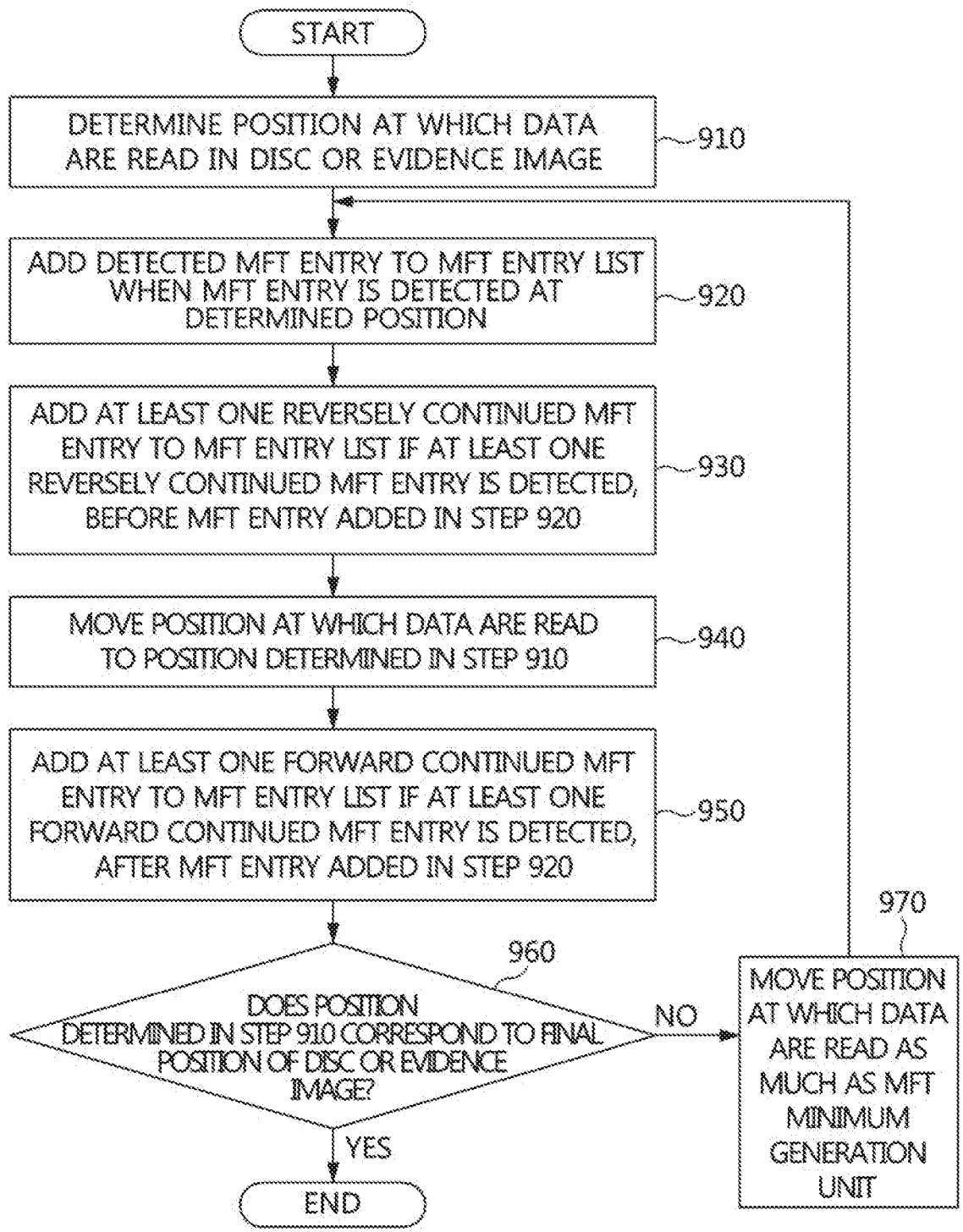
FIGS. 9A to 9D are flow charts of a method for searching for an MFT entry list according to an exemplary embodiment.

FIG. 9A is a flow chart of the method for searching for an MFT entry according to an exemplary embodiment.

Figure 9B:
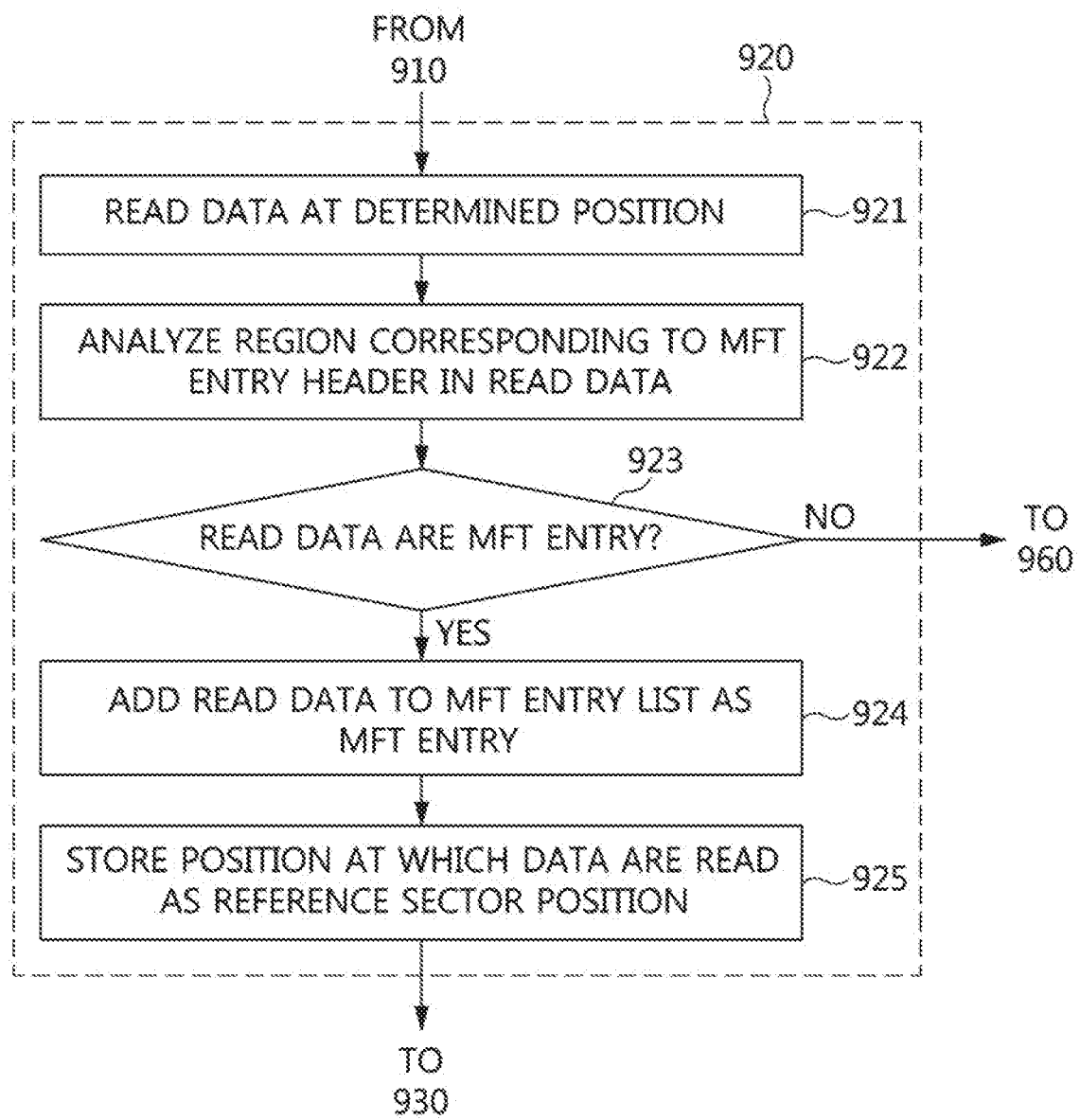

FIG. 9B is a flow chart of the method for searching for an MFT entry at a position determined by an MFT minimum generation unit according to an exemplary embodiment.

Figure 9C:
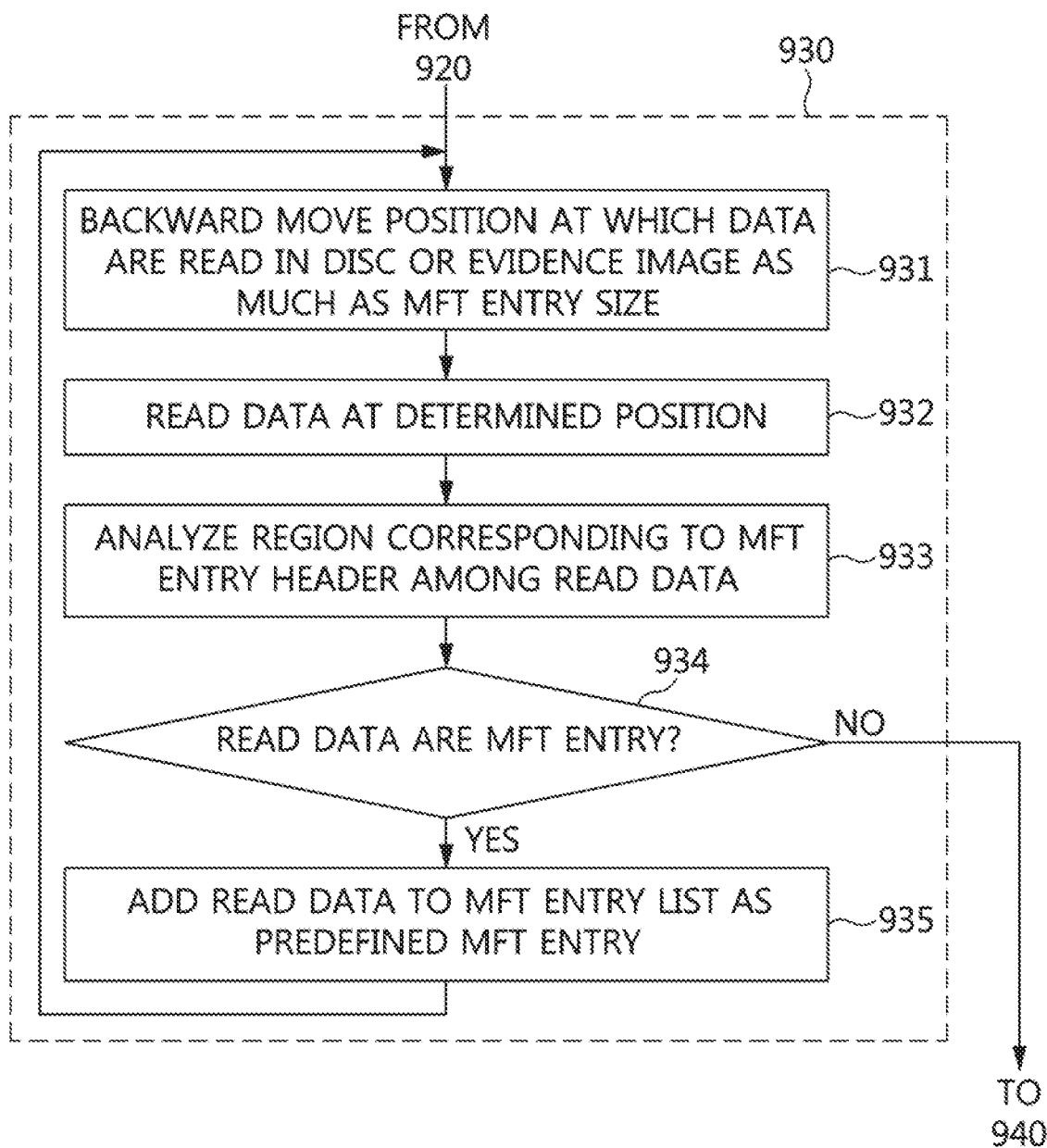

FIG. 9C is a flow chart of a method for searching for at least one reversely continued MFT entry according to an exemplary embodiment.

Figure 9D:
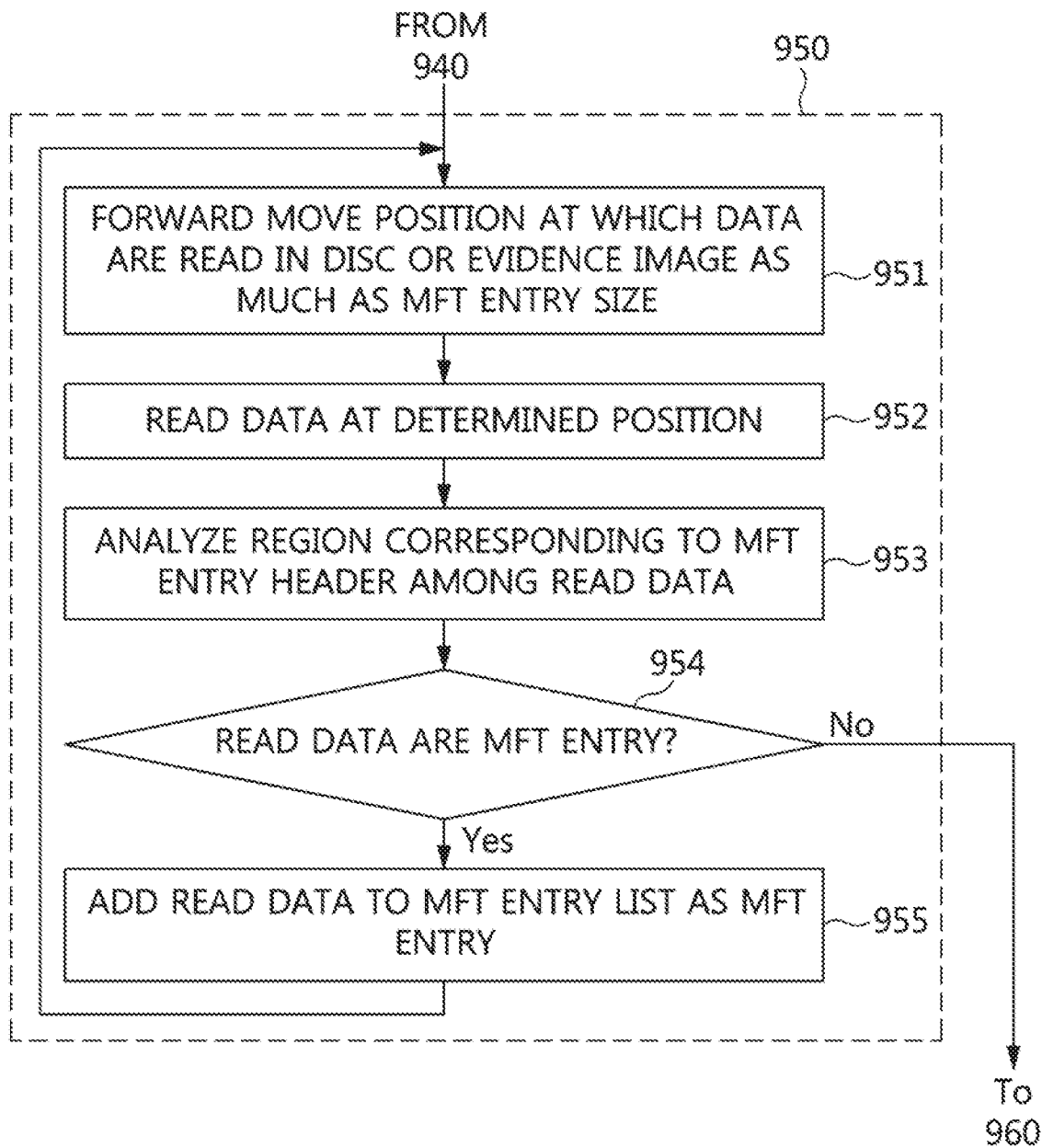

FIG. 9D is a flow chart of a method for searching for at least one of MFT entries forward continued according to an exemplary embodiment.

First, referring to FIG. 9A, the step 841 described with reference to FIG. 8 may include at least a portion of steps 910, 920, 930, 940, 950, 960, and 970 to be described below.

The collection unit 420 may use the MFT minimum generation unit in searching for the MFT entry for the search efficiency.

The MFT minimum generation unit may be a unit determined based on the MFT minimum size generated upon the format of the partition. For example, the partition may be the NTFS.

In the format of the NTFS partition, the cluster value may be set to be a value between a minimum of 512 bytes and a maximum of 64 kilobytes (KB). Here, 512 bytes may be one sector and 64 kilobytes may be 128 sectors. The MFT minimum size of the partition may be determined while the partition is formed depending on the set cluster value. For example, the MFT minimum generation unit may be 64 MFT entries. Since the MFT entry size may be 1024 bytes, the MFT minimum generation unit may be 65536 bytes. In this case, the MFT minimum generation unit may correspond to 128 sectors.

In the step 910, the collection unit 420 may use the MFT minimum generation unit to determine a position at which data are read in the disc or the evidence image.

For example, the position at which the data are read in the disc or the evidence image may be jumped as much as the MFT minimum generation unit. Here, the jump may mean that the read position in the disc or the evidence image moves from a current position to a next position.

The collection unit 420 may quickly search for the MFT entry by the jump as much as the MFT minimum generation unit.

In the step 920, the collection unit 420 may add to the detected MFT entry to the MFT entry list when the MFT entry is detected at the determined position.

Referring to FIG. 9B, the step 920 may include at least a portion of steps 921, 922, 923, 924, and 925.

In the step 921, the collection unit 420 may read data at the determined position.

In the step 922, the collection unit 420 may analyze a region corresponding to an MFT entry head among the read data.

In the step 923, the collection unit 420 may check whether the read data are the MFT entry by the analysis.

The collection unit 420 may use a predefined MFT entry header signature to check whether the read data are the MFT entry.

The MFT entry may include the predefined MFT entry header signature. For example, the predefined MFT entry header signature may be a predefined "FILE" character string.

The predefined MFT entry header signature may be in the predefined region of the MFT entry header. For example, the predefined MFT entry header signature may be bytes of offsets of 0 to 3 in the MFT entry header.

The collection unit 420 may determine the read data as the MFT entry when the predefined region among the read data has the value of the predefined MFT entry header signature. Here, the predefined region may be a region in which the predefined MFT entry header signature is positioned in the read data when the read data correspond to the MFT entry.

If the read data are the MFT entry, the step 924 may be performed. If the read data are not the MFT entry, the step 960 of FIG. 9A may be performed.

In the step 924, if it is determined that the read data are the MFT entry, the collection unit 420 may add the read data to the MFT entry list as the MFT entry.

The collection unit 420 may store an MFT entry sector position and an MFT identifier of the MFT entry in the MFT entry list.

In the step 925, the collection unit 420 may store the position at which the MFT entry is read as a reference sector position.

The reference sector position may be used a reference sector position for a reverse search and a forward search for the MFT entry to be described below.

An order described with the steps 924 and 925 is only an example. After the step 923, the step 925 may be performed and after the step 925, the step 924 may be performed.

Referring back to FIG. 9A, in the step 930, before the MFT entry added in the step 924, if at least one reversely continued MFT entry is detected, the collection unit 420 may add at least one reversely continued. MFT entry to the MFT entry list.

Here, the at least one reversely continued MFT entry may be a reversely continued MFT entry(s) before the MFT entry already added in step 924 based on the reference sector position.

Referring to FIG. 9C, the step 930 may include at least a portion of steps 931, 932, 933, 934, and 935.

In the step 931, the collection unit 420 may move the position at which the data are read in the disc or the evidence image backward from a current position as much as the MFT entry size. For example, the position at which the MFT entry is read in the disc or the evidence image may be backward jumped as much as the MFT entry size.

In the step 932, the collection unit 420 may read data at the determined position.

In the step 933, the collection unit 420 may analyze a region corresponding to an MFT entry head among the read data.

In the step 934, the collection unit 420 may check whether the read data are the MFT entry by the analysis. In the check, the same scheme as the step 923 may be used. Therefore, an overlapped description will be omitted.

If the read data are the MFT entry, the step 935 may be performed. If the read data are not the MFT entry, the step 940 may be performed.

In the step 935, the collection unit 420 may add to the read. MFT entry to the MFT entry list.

After the step 935 is performed, the step 931 may be repeated. As it were, by the steps 931, 932, 933, 934, and 935, the collection unit 420 may search for the MFT entry backward from the reference sector position. The steps 931, 932, 933, 934, and 935 may be repeated until the MFT entry is not found.

Referring back to FIG. 9A, in the step 940, the collection unit 420 may move the position at which the data are read in the disc or the evidence image to the reference sector position. As it were, after the backward search is completed, the position at which the MFT entry is read may again move to the position determined in the step 910 to perform the forward search.

In the step 950, after the MFT entry added in the step 924, if at least one forward continued MFT entry is detected, the collection unit 420 may add at least one MFT entry forward continued to the MFT entry list.

Here, the at least one forward continued MFT entry may be a forward continued MFT entry(s) after the MFT entry already added in step 924 based on the reference sector position.

Referring to FIG. 9D, the step 950 may include at least a portion of steps 951, 952, 953, 954, and 955.

In the step 951, the collection unit 420 may move the position at which the data are read in the disc or the evidence image forward from a current position as much as the MFT entry size. For example, the position at which the MFT entry are read in the disc or the evidence image may be jumped as much as the MFT entry size.

In the step 952, the collection unit 420 may read data at the determined position.

In the step 953, the collection unit 420 may analyze a region corresponding to an MFT entry head among the read data.

In the step 954, the collection unit 420 may check whether the read data are the MFT entry by the analysis.

If the read data are the MFT entry, the step 955 may be performed. If the read data are not the MFT entry, the step 960 may be performed.

In the step 955, the collection unit 420 may add to the read MFT entry to the MFT entry list.

After the step 955 is performed, the step 951 may be repeated. As it were, by the steps 951, 952, 953, 954, and 955, the collection unit 420 may search for the MFT entry forward from the reference sector position. The steps 951, 952, 953, 954, and 955 may be repeated until the MFT entry is not found.

Referring back to FIG. 9A, the foregoing order of the steps 930 and 950 is only an example and the positions of the steps 940 and 950 may be changed from each other.

In the step 960, the collection unit 420 may check whether the position determined in the steps 910 or 970 corresponds to a final position of the disc or the evidence image. If the determined position does not correspond to the final position, the step 970 may be performed. If the determined position corresponds to the final position, a procedure may end.

In the step 970, the collection unit 420 may move the position at which the data are read in the disc or the evidence image as much as the MFT minimum generation unit.

When the step 970 is performed, the step 920 may be repeated again.

The MFT entry list may be stored as a data structure of a list form. The MFT entry list according to the exemplary embodiment will be described with reference to FIG. 21.

Figure 10A:
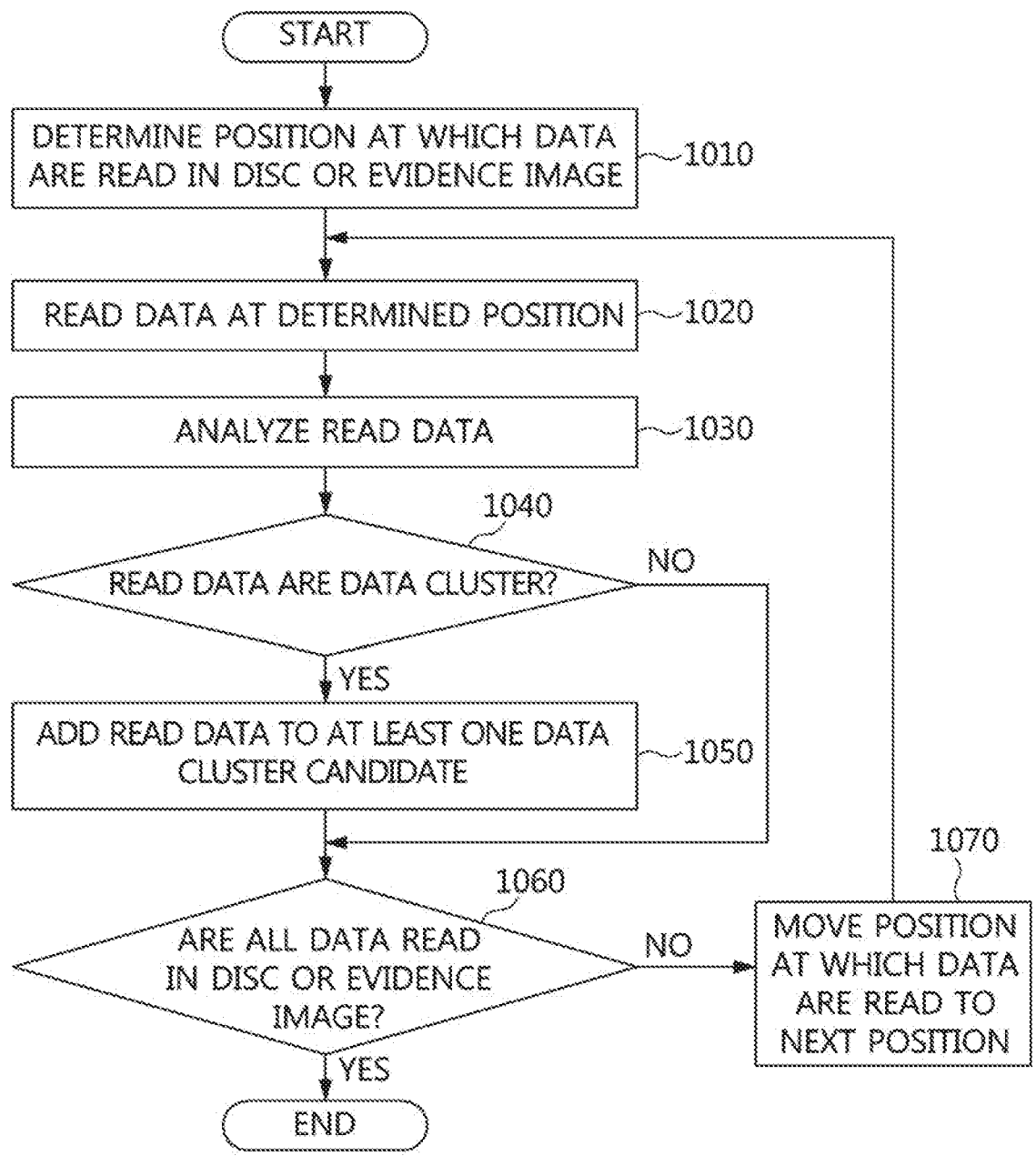
FIGS. 10A and 10B are flow charts of a method for searching a data cluster candidate according to an exemplary embodiment.
Figure 10B:
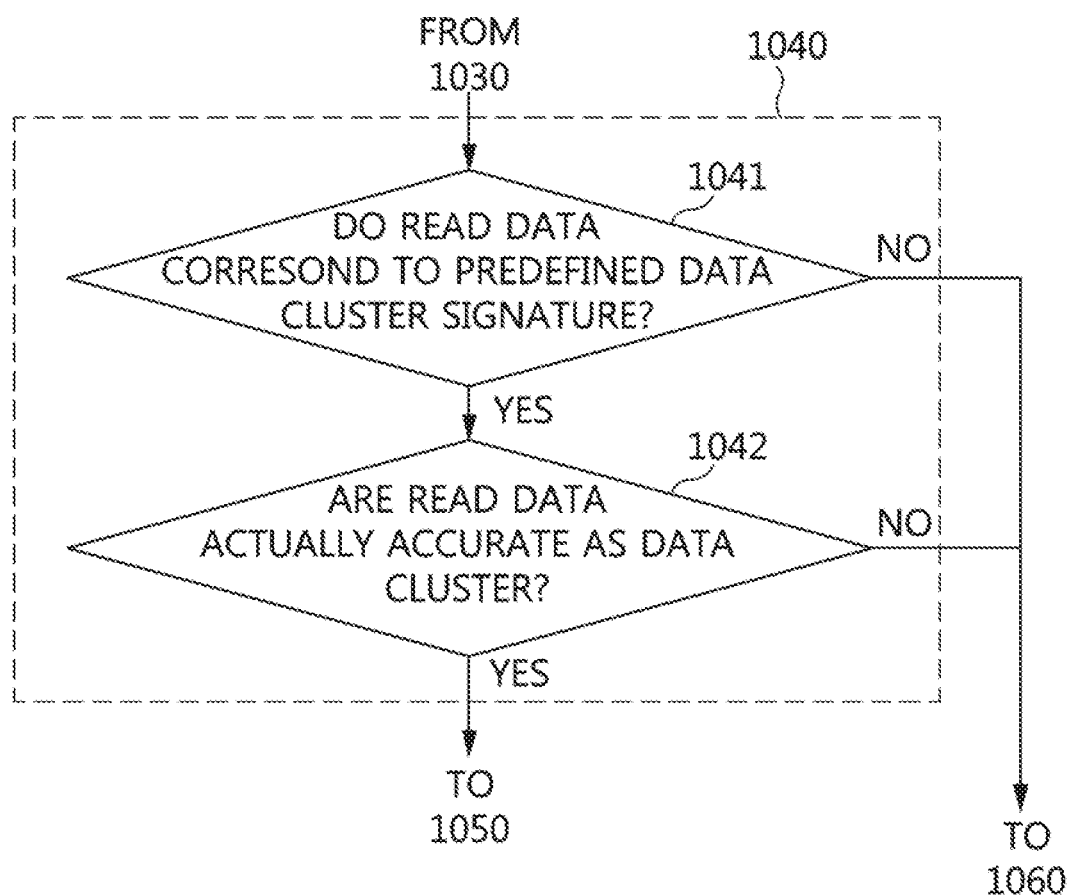

FIGS. 10A and 10B are flow charts of a method for searching a data cluster candidate according to an exemplary embodiment.

FIG. 10A is a flow chart of a method for reading out data for the search of the data cluster candidate according to an exemplary embodiment.

FIG. 10B is a flow chart of a method for determining whether the data are the data cluster according to an exemplary embodiment.

First, referring to FIG. 10A, the step 842 described with reference to FIG. 8 may include at least a portion of steps 1010, 1020, 1030, 1040, 1050, 1060, and 1070 to be described below.

In the steps 1010, 1020, 1030, 1040, 1050, 1060, and 1070 of FIG. 10A, the collection unit 420 may search for at least one data cluster candidate. Each data cluster candidate of at least one data cluster candidate may be the data cluster which may be paired with the MFT entry of the MFT entry list searched in the step 841. Alternatively, each data cluster candidate may be the information on the data cluster which may be paired with the MFT entry of at least one MFT entry list searched in the step 841.

For example, when the MFT entry corresponds to the file, a data cluster of an address that a "data cluster run list" of a "non-resident" attribute of a "$Data" attribute of the MFT entry indicates may be paired with the MFT entry. The data cluster that is paired with the MFT entry corresponding to the file may indicate a data content.

Further, for example, when the MFT entry corresponds to the directory (or folder), a data cluster of an address that a "data cluster run list" of a "non-resident" attribute of a "$Index_Allocation" attribute of the MFT entry indicates may be paired with the MFT entry. The data cluster that is paired with the MFT entry corresponding to the directory (or folder) may indicate an index record.

In the step 1010, the collection unit 420 may determine the position at which the data are read in the disc or the evidence image. For example, the collection unit 420 may determine a start of the disc or the evidence image as the position at which the data are read. The read position may indicate the sector of the disc or the evidence image. The start of the disc or the evidence image may be a first sector of the disc or the evidence image.

In the step 1020, the collection unit 420 may read data at the determined position. The read data may be at least one sector. As it were, the collection unit 420 may read data in a sector unit.

In the step 1030, the collection unit 420 may analyze the read data.

In the step 1040, the collection unit 420 may check whether the read data are the data cluster by the analysis.

If it is determined that the read data are the data cluster, the step 1050 may be performed. If it is determined that the read data are not the data cluster, the step 1060 may be performed.

Referring to FIG. 10B, the step 1040 may include the steps 1041 and 1042.

In the step 1041, the collection unit 420 may determine whether the read data correspond to the predefined data cluster signature.

When the read data are the predefined data cluster signature, the step 1042 may be performed. When the read data do not correspond to the predefined data cluster signature, the step 1060 of FIG. 10A may be performed.

The collection unit 420 may use the predefined data cluster signature to determine whether the read data are the data cluster.

The data cluster may include the predefined data cluster signature. For example, the predefined data cluster signature may be the predefined character string.

The predefined data cluster signature may be in the predefined region of the sector. For example, the predefined data cluster signature may be bytes of the offset within the predefined range of the sector.

When the read data includes the predefined data cluster signature, the collection unit 420 may determine that the read data correspond to the predefined data cluster signature. When the read data do not include the predefined data cluster signature, the collection unit 420 may determine that the read data do not correspond to the predefined data cluster signature.

Alternatively, when the predefined region of the read data has the value of the predefined data cluster signature, the collection unit 420 may determine that the read data correspond to the predefined data cluster signature. When the predefined region of the read data do not have the value of the predefined data cluster signature, the collection unit 420 may determine that the read data do not correspond to the predefined data cluster signature. Here, the predefined region may be a region in which the predefined data cluster signature is positioned in the read data when the read data correspond to the data cluster.

In the step 1042, the collection unit 420 may determine whether the read data are actually accurate as the data cluster. The collection unit 420 may check whether the read data may satisfy the predefined condition. If the read data satisfy the predefined condition, the collection unit 420 may determine that the read data are a predefined data cluster. If the read data do not satisfy the predefined condition, the collection unit 420 may determine that the read data are not the predefined data cluster.

The data cluster may be stored in the plurality of sectors. For example, the collection unit 420 may verify whether the contents of data of all the plurality of sectors coincide. The collection unit 420 may compare between the data of the plurality of sector to perform the verification. If it is verified that the whole contents of data coincide, the collection unit 420 may determine that the read data are actually the data cluster. If it is verified that the whole contents of data do not coincide, the collection unit 420 may determine that the read data are actually not the predefined data cluster.

If it is determined that the read data are actually the data cluster, the step 1050 may be performed. If it is determined that the read data are not the predefined data cluster, the step 1060 may be performed.

Referring back to FIG. 10A, in the step 1050, if it is determined that the read data are the predefined data cluster, the collection unit 420 may add the read data to at least one data cluster candidate as the data cluster. For example, if it is determined that the read data are the predefined data cluster, the collection unit 420 may store the data determined to be the data cluster as the data cluster candidate.

In the step 1060, the collection unit 420 may determine whether all the data are read in the disc or the evidence image.

If it is determined that all the data are read in the disc or the evidence image, the procedure may end. The step 1070 of determining that all the data are not read in the disc or the evidence image may be performed.

For example, the collection unit 420 may determine whether the sector read in the step 1020 is the final sector of the disc or the evidence image. If it is determined that the read sector is a final sector of the disc or the evidence image, the procedure may end. If it is determined that the read sector is not the final sector of the disc or the evidence image, the step 1070 may be performed.

In the step 1070, the collection unit 420 may move the position at which the data are read in the disc or the evidence image from a current position to a next position. For example, the collection unit 420 may move the position at which the data are read in the disc or the evidence image to a next sector.

The collected at least one data cluster candidate may be stored as the data structure of the list form. The list of at least one data cluster candidate according to an exemplary embodiment will be described below with reference to FIG. 23.

Figure 11A:
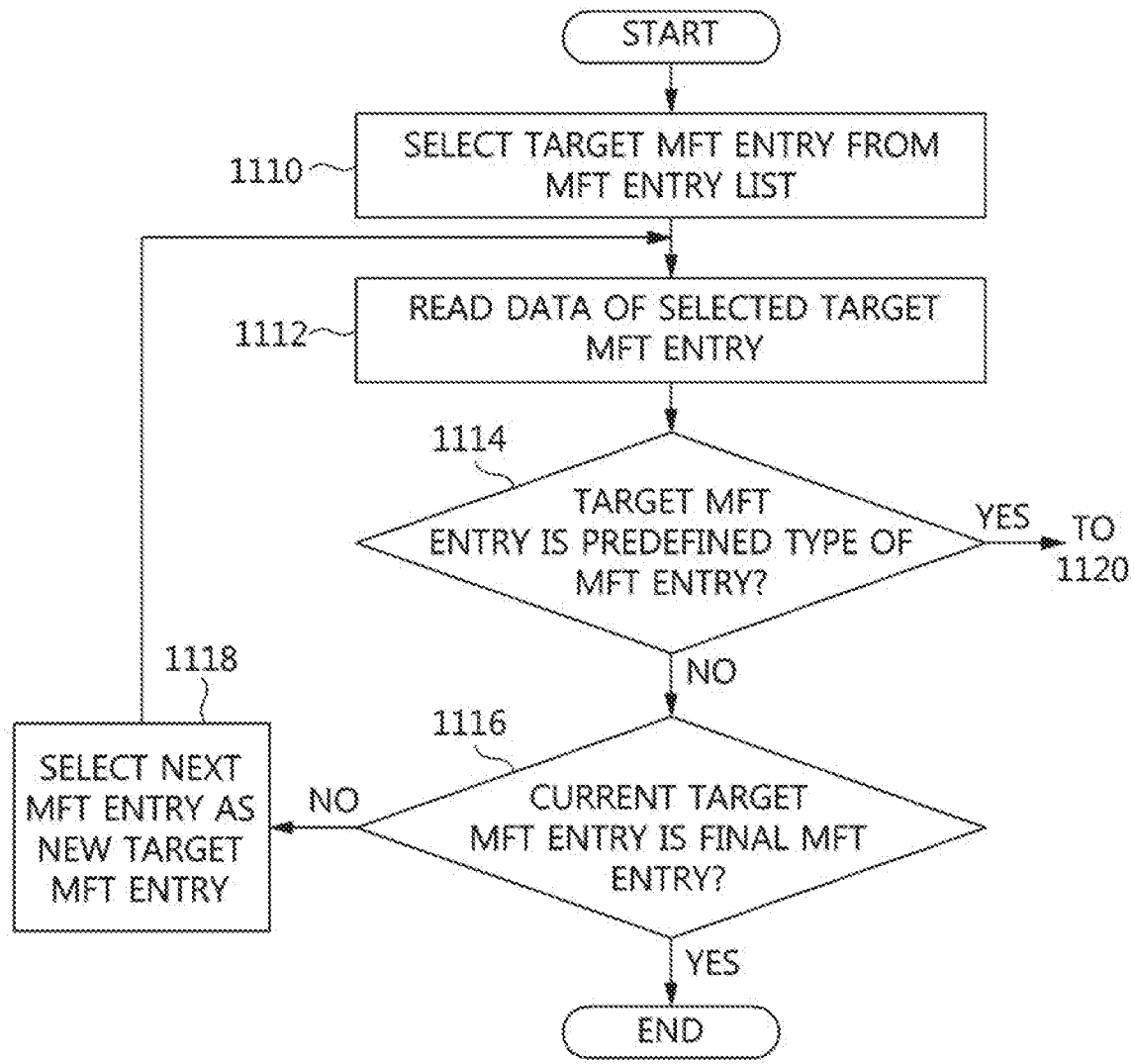
FIGS. 11A and 11B are flow charts of a method for generating an MFT entry-data cluster pair candidate according to an exemplary embodiment.
Figure 11B:
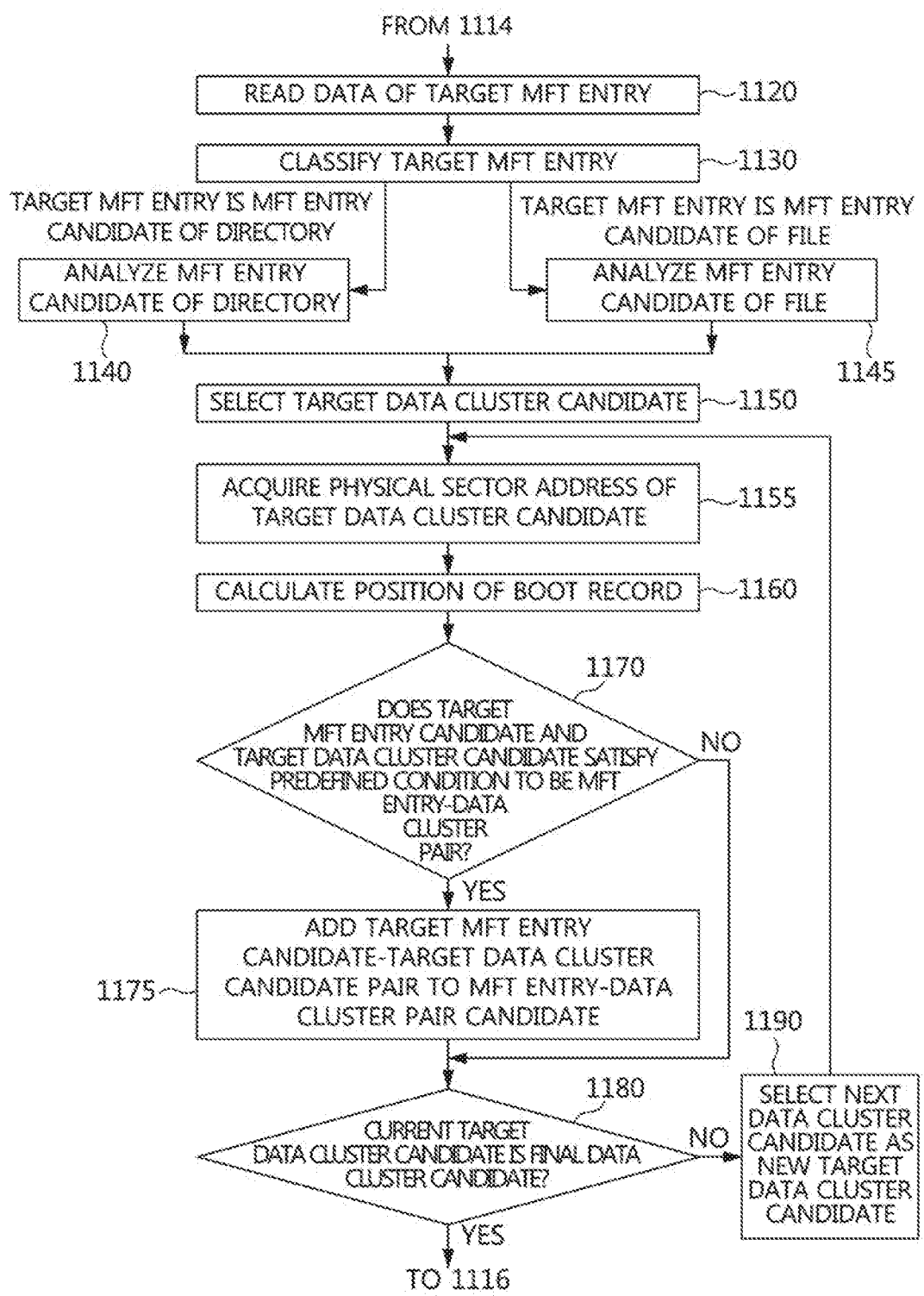

FIGS. 11A and 11B are flow charts of a method for generating an MFT entry-data cluster pair candidate according to an exemplary embodiment.

FIG. 11A is a flow chart of the method for searching for a target MFT entry candidate according to an exemplary embodiment.

FIG. 11B is a flow chart of a method for generating an MFT entry-data cluster pair for a selected target MFT entry candidate according to an exemplary embodiment.

In steps 1110, 1112, 1114, and 1116 to be described below, the analysis unit 430 may select one MFT entry in the MFT entry list and may select one data cluster candidate from at least one data cluster candidate. The analysis unit 430 may check whether the selected MFT entry and the selected data cluster candidate form the MFT entry-data cluster pair. Hereinafter, the selected MFT entry to be checked is named the target MFT entry candidate and the selected data cluster candidate to be checked is named as the target data cluster candidate.

The MFT entry candidate forming the MFT entry-data cluster pair candidate may be the predefined type of MFT entry. The analysis unit 430 may search for the predefined type of MFT entry in the MFT entry list. The analysis unit 430 may perform the matching with the data cluster candidate for the MFT entry candidate corresponding to the predefined type of MFT entry among at least one MFT entry.

The predefined MFT entry and the data of the predefined MFT entry according to the exemplary embodiment will be each described with reference to FIGS. 17A and 17B.

The predefined type of MFT entry may be the MFT entry that may provide mapping to a physical address from a logical cluster number (LCN) address recorded in the MFT entry. The layout of the partition may be recovered by the mapping.

The predefined type of MFT entry may include the MFT entry of the file and the MFT entry of the directory.

The MFT entry of the file may be the MFT entry in which the "$Data" attribute is "non-resident". The MFT entry of the directory may be the MFT entry in which the "$Index_Allocation" attribute is "non-resident".

First, referring to FIG. 11A, by steps 1110, 1112, 1114, 1116, and 1118 to be described below, the predefined type of MFT entry may be selected as the target MFT entry candidate.

In step 1110, the analysis unit 430 may select the target MFT entry from the MFT entry list in the step 841. The analysis unit 430 may select the first MFT entry of the MFT entry list as the target MFT entry.

For example, the analysis unit 430 may select the first MFT entry of the MFT entry list as the target MFT entry.

In step 1112, the analysis unit 430 may read the data of the target MFT entry selected by the access unit 410.

In the step 1114, the analysis unit 430 may check whether the target MFT entry is the predefined type of MFT entry.

When the target MFT entry is the predefined type of MFT entry, the step 1120 to be described with reference to FIG. 11B may be performed. When the target MFT entry is the predefined type of MFT entry (that is, when the predefined MFT entry within the MFT entry list is confirmed), the target MFT entry may be managed as the MFT entry candidate. Further, the target MFT entry may be considered as the MFT entry candidate.

The collected at least one MFT entry candidate may be stored as the data structure of the list form. The list of the at least one MFT entry candidate according to an exemplary embodiment will be described below with reference to FIG. 22.

When the target MFT entry is not the predefined type of MFT entry, the step 1116 may be performed.

The step 1116 may be performed even after the step 1180 to be described below with reference to FIG. 11B.

In the step 1116, the analysis unit 430 may check whether a current target MFT entry is a final MFT entry of at least one MFT entry of the MFT entry list.

When the current target MFT entry is the final MFT entry, the procedure may end.

When the current target MFT entry is not the final MFT entry, the step 1118 may be performed.

In the step 1118, the analysis unit 430 may select a next MFT entry of the current target MFT entry as a new target MFT entry. After the new target MFT entry is selected, the step 1112 may be performed.

Next, referring to FIG. 11B, steps 1120, 1130, 1140, 1145, 1150, 1150, 1160, 1170, 1175, 1180, and 1190 to be described below may be performed on the target MFT entry candidate determined as the predefined type of MFT entry.

In the step 1120, the analysis unit 430 may read the data of the target MFT entry from the disc or the evidence image.

The analysis unit 430 may read the sector in which the data of the target MFT entry are stored from the disc or the evidence image to read the data of the target MFT entry.

In the step 1130, the analysis unit 430 may classify the target MFT entry into one of the MFT entry of the directory and the MFT entry of the file.

For example, the analysis unit 430 may use the information on the predefined offset of the MFT entry header of the target MFT entry to classify the target MFT entry as the target MFT entry candidate. The predefined offset may be a "flags" offset. The "flags" offsets may be offsets of 22 and 23. Here, a unit of the offset may be a byte.

For example, if a value of the "flags" offsets are "00 00" or "01 00", the target MFT entry may be classified as the file. If a value of the "flags" offsets are "02 00" or "03 00", the target MFT entry may be classified as the directory.

When the target MFT entry is the MFT entry candidate of the directory, the step 1140 may be performed. When the target MFT entry is the MFT entry candidate of the file, the step 1145 may be performed.

In the step 1140, the analysis unit 430 may analyze the target MFT entry candidate that is the MFT entry of the directory. The results acquired by the analysis may be used to calculate the cluster size of the partition to be recovered.

By the analysis, the analyzer 430 may acquire a directory index start position cluster offset "MEStartClusterOffset" of the MFT entry and the number "DefinedMETotalCluster" of directory index cluster of the MFT entry. The analysis unit 430 may acquire the directory index start position cluster offset "MEStartClusterOffset" of the MFT entry and the number "DefinedMETotalCluster" of directory index clusters of the MFT entry by analyzing the "data cluster run list" of the "non-resident" attribute of the "$Index_Allocation" attribute of the MFT entry.

In the step 1145, the analysis unit 430 may analyze the target MFT entry that is the MFT entry of the file. The results acquired by the analysis may be used to calculate the cluster size of the partition to be recovered.

By the analysis, the analyzer 430 may acquire an MFT entry file start position cluster offset "MEStartClusterOffset" of the MFT entry and the number "DefinedMETotalauster" of clusters of the MFT entry. The analysis unit 430 may acquire the MFT entry file start position cluster offset "MEStartClusterOffset" of the MFT entry and the number "DefinedMETotalCluster" of clusters of the MFT entry by analyzing the "data cluster run list" of the "non-resident" attribute of the "$Data" attribute of the MFT entry.

In the step 1150, the analysis unit 430 may select the target data cluster candidate from at least one data cluster candidate collected in the step 842. The analysis unit 430 may select the first data cluster of at least one data cluster candidate as the target data cluster candidate.

In the step 1155, the analysis unit 430 may acquire a physical sector offset of the selected target data cluster candidate.

In the step 1160, the analysis unit 430 may use the target MFT entry candidate and the target data cluster candidate to calculate the position of the boot record. As it were, the analysis unit 430 may use at least one MFT entry candidate and the target data cluster candidate of at least one data cluster candidate that are present in the MFT entry list to calculate the position of the boot record.

Hereinafter, the position of the boot record may mean the sector offset of the boot record.

The analysis unit 430 may calculate the position of the boot record based on a relative position between the target MFT entry candidate and the target data cluster candidate.

The method for calculating a position of a boot record according to an exemplary embodiment will be described with reference to FIGS. 12 and 13, respectively.

In the step 1170, the analysis unit 430 may determine whether the target MFT entry candidate and the target data cluster candidate satisfy the predefined condition to be the MFT entry-data cluster pair.

If it is determined that the target MFT entry candidate and the target data cluster candidate satisfy the predefined condition to be the MFT entry-data cluster pair, the step 1175 may be performed. If it is determined that the target MFT entry candidate and the target data cluster candidate does not satisfy the predefined condition to be the MFT entry-data cluster pair, the step 1180 may be performed.

For example, the predefined condition may be that the target MFT entry candidate and the target data cluster candidate are data within the same partition. As it were, if the target MFT entry candidate and the target data cluster candidate are data within the same partition, the target MFT entry candidate and the target data cluster candidate may form the MFT entry-data cluster pair. On the other hand, if the target MFT entry candidate and the target data cluster candidate are data within different partitions, the target MFT entry candidate and the target data cluster candidate may form the MFT entry-data cluster pair.

The analysis unit 430 may determine whether the target MFT entry candidate and the target data cluster candidate are data within the same partition. The analysis unit 430 may determine whether the target MFT entry candidate and the target data cluster candidate are data within the same partition based on the position of the boot record.

If the target MFT entry candidate and the target data cluster candidate are data within the same partition, the step 1175 may be performed. If the target MFT entry candidate and the target data cluster candidate are not data within the same partition, the step 1180 may be performed.

In the step 1175, the analysis unit 430 may add the pair of target MFT entry candidate and target data cluster candidate to at least one MFT entry-data cluster pair candidate.

As it were, if the target MFT entry candidate and the target data cluster candidate satisfy the predefined condition, the analysis unit 430 may add the pair of target MFT entry candidate and target data cluster candidate to the at least one MFT entry-data cluster pair candidate. For example, if the target MFT entry candidate and the target data cluster candidate are the data within the same partition, the analysis unit 430 may add the pair of target MFT entry candidate and target data cluster candidate to the at least one MFT entry-data cluster pair candidate.

In the step 1180, the analysis unit 430 may check whether the current target data cluster candidate is the final data cluster candidate of at least one data cluster candidate.

When the current target data cluster candidate is the final data cluster candidate, the procedure for the current target MFT entry candidate may end and then the foregoing step 1116 may be performed with reference to FIG. 11A.

If the current target data cluster candidate is not the final data cluster candidate, the step 1190 may be performed.

In the step 1190, the analysis unit 430 may check whether the current target data cluster candidate is a next data cluster candidate as a new target data cluster candidate. After the new target data cluster candidate is selected, the step 1155 may be perform ed.

By the foregoing process, the position of the boot record for the target MFT entry candidate and the target data cluster candidate may be calculated and it may be determined whether the target MFT entry candidate and the target data cluster candidate belong to the same partition.

For example, when the MFT entry list includes three predefined MFT entries and the three predefined data cluster candidate information is present, for each of the total of nine cases, the position of the boot record may be calculated and for each case, it may be determined whether the target MFT entry and the target data cluster candidate belong to the same partition.

Figure 12:
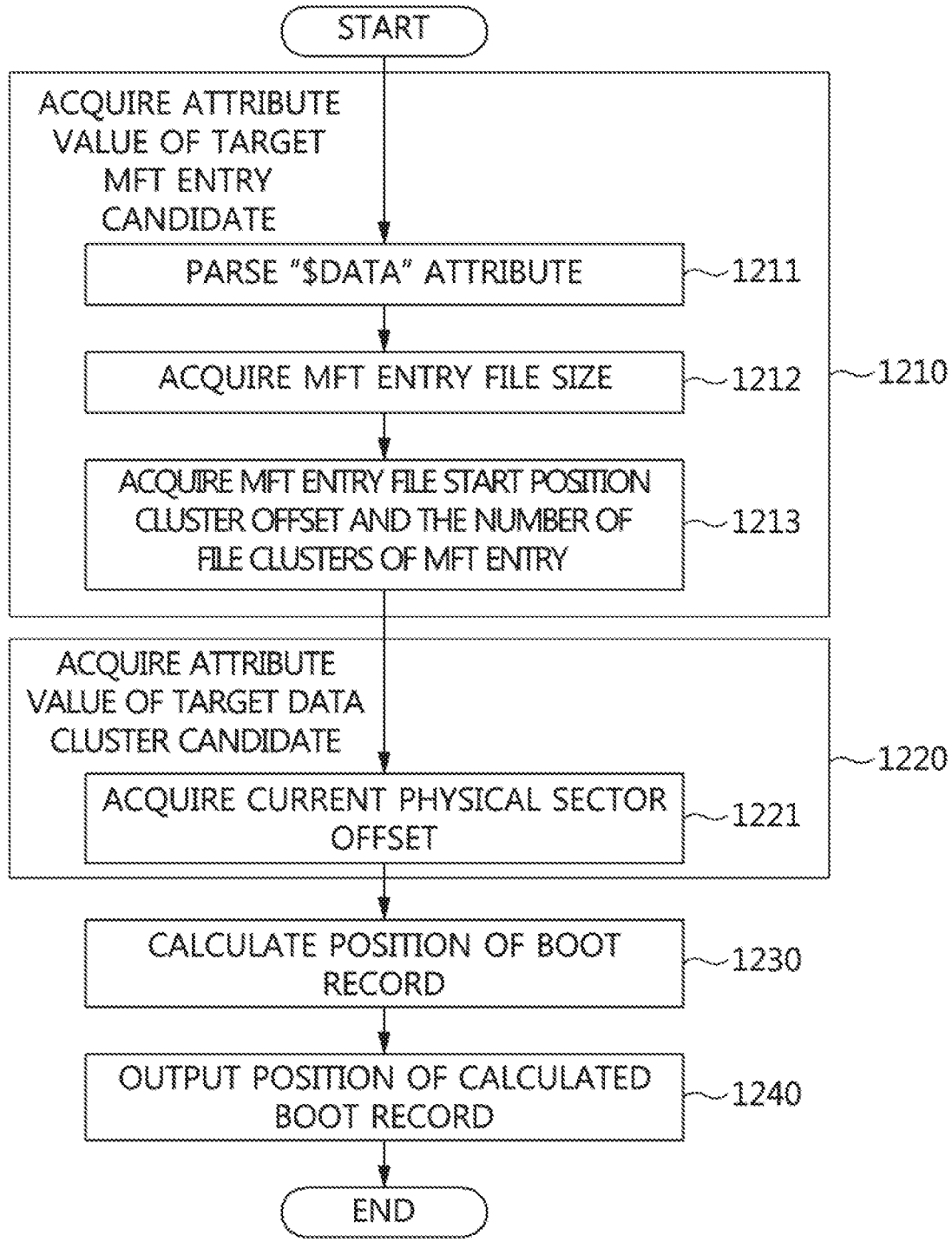
FIG. 12 is a flow chart of a method for calculating a position of a boot record for an MFT entry of a file according to an exemplary embodiment.

FIG. 12 is a flow chart of a method for calculating a position of a boot record for an MFT entry of a file according to an exemplary embodiment.

The step 1160 described with reference to FIG. 11B may include at least some of the steps 1210, 1211, 1212, 1213, 1220, 1221, 1230, and 1240 to be described below.

In the step 1210, the analysis unit 430 may analyze the target MFT entry, candidate to acquire the attribute values of the target MFT entry candidate.

The attribute values of the target MFT entry candidate may include an MFT entry file size "DefinedMETotalBytes" of the target MFT entry candidate, an MFT entry file start position cluster offset "MEStartClusterOffset" of the target MFT entry candidate, and the number "DefinedMETotalCluster" of MFT entry file clusters of the target MFT entry candidate.

The step 1210 may include steps 1211, 1212, and 1213.

In the step 1211, the analysis unit 430 may parse the "$Data" attribute of the target MFT entry candidate.

After the parsing is performed, in the steps 1212 and 1213, the analysis unit 430 may analyze a header of the "non-resident" attribute of the "$Data" attribute of the target MFT entry candidate.

In the step 1212, the analysis unit 430 may acquire the MFT entry file size "DefinedMETotalBytes" of the target MFT entry candidate by analyzing the header of the "non-resident" attribute. The analysis unit may acquire the MFT entry file size "DefinedMETotalBytes" from the predefined offset of the header of the "non-resident" attribute. The predefined offset may be "allocated size of attribute content" offsets. "allocated size of attribute content" offsets may be offsets of 40 to 47.

In the step 1213, the analysis unit 430 may acquire an MFT entry file start position cluster offset "MEStartClusterOffset" of the target MFT entry candidate and the number "DefinedMETotalCluster" of MFT entry file clusters of the target MFT entry candidate by analyzing the header of the "non-resident" attribute. The analysis unit may acquire the MFT entry file start position cluster offset "MEStartClusterOffset" and the number "DefinedMETotalCluster" of MFT entry file clusters from the predefined offset of the header of the "non-resident" attribute. The predefined offset may be "data cluster run list" offsets. The "data cluster run list" offsets may be offsets that are equal to or more than 64.

In the step 1220, the analysis unit 440 may analyze the target data cluster candidate to acquire the attribute values of the target data cluster candidate.

The attribute values of the target data cluster candidate may include a current physical sector offset "DefinedDCCurrentPhysicalSectorOffset" of the target data cluster candidate.

The step 1220 may include the step 1221.

In the step 1221, the analysis unit 440 may acquire the current physical sector offset "DefinedDCCurrentPhysicalSectorOffset" of the target data cluster candidate.

In the step 1230, the analysis unit 430 may use the attribute values of the target MFT entry candidate and the attribute values of the target data cluster candidate to calculate the position of the boot record.

First, the analysis unit 430 may use the MFT entry file size "DefinedMETotalBytes" of the target MFT entry candidate and the number "DefinedMETotalCluster" of clusters of the target MFT entry candidate to calculate the number "MEBytesPerCluster" of bytes per the cluster of the virtual partition.

The analysis unit 430 may calculate the number "MEBytesPerCluster" of bytes per the cluster of the virtual partition based on the following Equation 1.

MEBytesPerCluster=DefinedMETotalBytes/Defined-
METotalCluster [Equation 1]

Next, the analysis unit 430 may calculate a physical sector offset "MEBROffset" of the boot record of the virtual partition based on a current physical sector offset "DefinedDCCurrentPhysicalSectorOffset" of the target data cluster candidate, the MFT entry file start position cluster offset "MEStartClusterOffset" of the target MFT entry candidate, and a byte size "MEBytesPerCluster" per the cluster of the virtual partition.

The analysis unit 430 may calculate the physical sector offset "MEBROffset" of the boot record of the virtual partition based on the following Equation 2.

MEBROffset=DefinedDCCurrentPhysicalSectorOffset−
(MEStartClusterOffset*MEBytesPerCluster 512
bytes) [Equation 2]

For the calculated result to indicate the physical sector, the analysis unit 430 may divide the current physical sector offset "DefinedDCCurrentPhysicalSectorOffset" of the target data cluster candidate by 512 bytes. Further, when the disc supports the expanded disc, a basic sector unit of the sector may be a multiple of 512 bytes. When the basic sector unit is not 512 bytes, the analysis unit 430 may consider the basic sector unit in performing the calculation of Equations 1 and 2.

In the step 1240, the analysis unit 430 may output the calculated position of the boot record.

Figure 13:
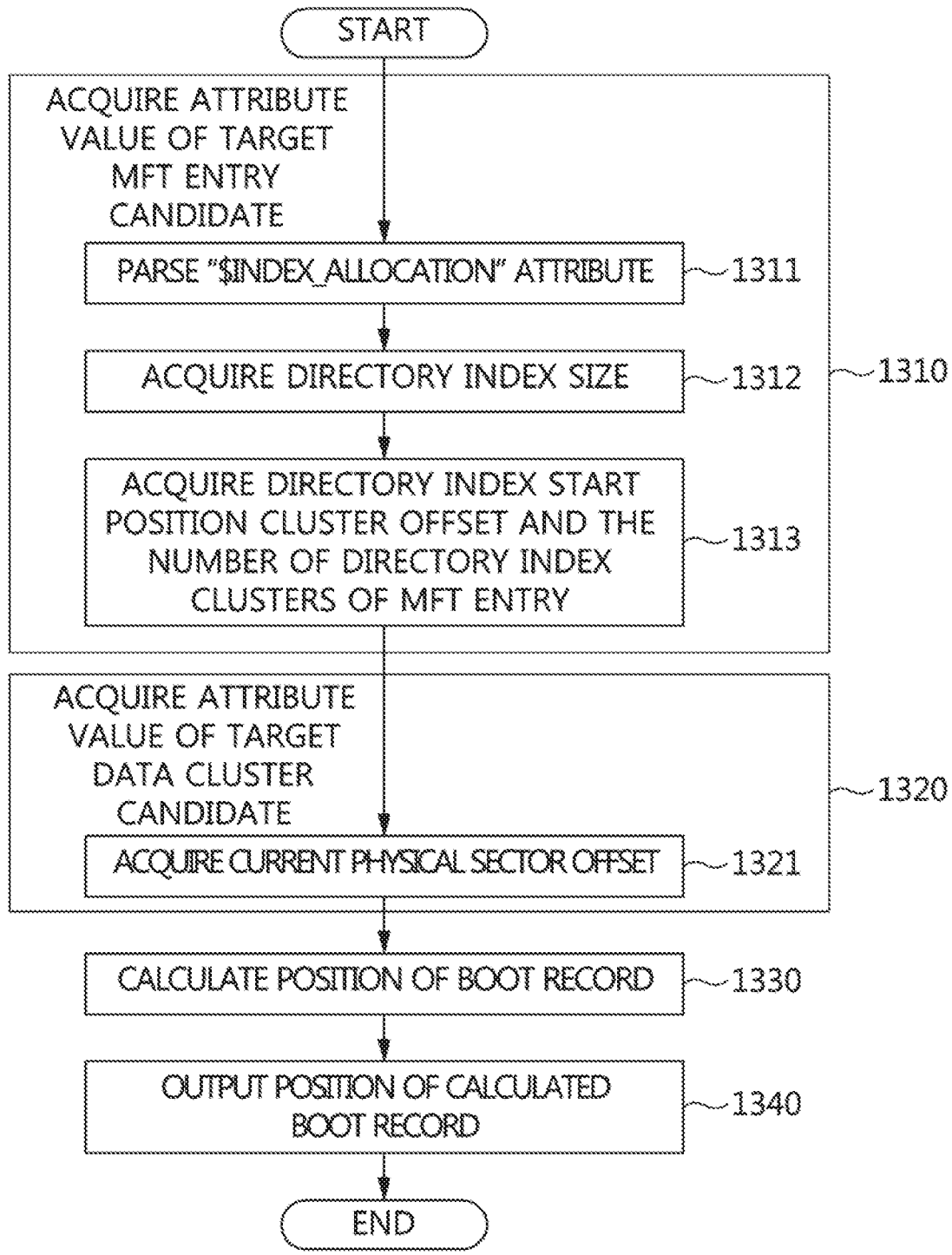
FIG. 13 is a flow chart of a method for calculating a position of a boot record for an MFT entry of a directory according to an exemplary embodiment.

FIG. 13 is a flow chart of a method for calculating a position of a boot record for an MFT entry of a directory according to an exemplary embodiment.

The step 1160 described with reference to FIG. 11B may include at least some of the steps 1310, 1311, 1312, 1313, 1320, 1321, 1330, and 1340 to be described below.

In the step 1310, the analysis unit 430 may analyze the target MFT entry candidate to acquire the attribute values of the target MFT entry candidate.

The attribute values of the target MFT entry candidate may include a directory index size "DefinedMETotalBytes" of the target MFT entry candidate, a directory index start position cluster offset "MEStartClusterOffset" of the target MFT entry candidate, and the number "DefinedMETotalCluster" of directory index clusters of the MFT entry of the target MFT entry candidate.

The step 1310 may include steps 1311, 1312, and 1313.

In the step 1311, the analysis unit 430 may parse the "$Index_Allocation" attribute of the target MFT entry candidate.

After the parsing is performed, in the steps 1312 and 1313, the analysis unit 430 may analyze the header of the "non-resident" attribute of the "$Index_Allocation" attribute of the target MFT entry candidate.

In the step 1312, the analysis unit 430 may acquire the directory index size "DefinedMETotalBytes" of the target MFT entry candidate by analyzing the header of the "$Index_Allocation" attribute. The analysis unit may acquire the directory index size "DefinedMETotalBytes" from the predefined offset of the header of the "non-resident" attribute. The predefined offset may be the "real size of attribute content" offsets. The "real size of attribute content" offsets may be offsets of 48 to 55.

In the step 1313, the analysis unit 430 may acquire the directory index start position cluster offset "MEStartClusterOffset" of the target MFT entry candidate and the number "DefinedMETotalCluster" of clusters of the target MFT entry candidate by analyzing the header of the "non-resident" attribute. The analysis unit may acquire the directory index start position cluster offset "MEStartClusterOffset" and the number "DefinedMETotalCluster" of directory index clusters of the MFT entry from the predefined offset of the header of the "non-resident" attribute. The predefined offset may be the "data cluster run list" offsets. The "data cluster run list" offsets may be offsets that are equal to or more than 64.

In the step 1320, the analysis unit 440 may analyze the target data cluster candidate to acquire the attribute values of the target data cluster candidate.

The attribute values of the target data cluster candidate may include a current physical sector offset "DefinedDCCurrentPhysicalSectorOffset" of the target data cluster candidate.

The step 1320 may include the step 1321.

In the step 1321, the analysis unit 440 may acquire the current physical sector offset "DefinedDCCurrentPhysicalSectorOffset" of the target data cluster candidate. The foregoing acquisition may be applied to the case in which the "$Index_Allocation" is present in the MFT entry of the directory.

In the step 1330, the analysis unit 430 may use the attribute values of the target MFT entry candidate and the attribute values of the target data cluster candidate to calculate the position of the boot record.

First, the analysis unit 430 may use the directory index size "DefinedMETotalBytes" of the target MFT entry candidate and the number "DefinedMETotalCluster" of clusters of the target MFT entry candidate to calculate the size "MEBytesPerCluster" of bytes per the cluster of the virtual partition.

The analysis unit 430 may calculate the number "MEBytesPerCluster" of bytes per the cluster of the virtual partition based on the following Equation 3.

MEBytesPerCluster=DefinedMETotalBytes/Defined-
METotalCluster [Equation 3]

Next, the analysis unit 430 may calculate a physical sector offset "MEBROffset" of the boot record of the virtual partition based on a current physical sector offset "DefinedDCCurrentPhysicalSectorOffset" of the target data cluster candidate, the directory index start position cluster offset "MEStartClusterOffset" of the target MFT entry candidate, and a byte size "MEBytesPerCluster" per the cluster of the virtual partition.

The analysis unit 430 may calculate the physical sector offset "MEBROffset" of the boot record of the virtual partition based on the following Equation 4.

MEBROffset=DefinedDCCurrentPhysicalSectorOffset−
(MEStartClusterOffset*MEBytesPerCluster/512
bytes) [Equation 4]

For the calculated result to indicate the physical sector, the analysis unit 430 may divide the current physical sector offset "DefinedDCCurrentPhysicalSectorOffset" of the target data cluster candidate by 512 bytes. Further, when the disc supports the expanded disc, a basic sector unit of the sector may be a multiple of 512 bytes. When the basic sector unit is not 512 bytes, the analysis unit 430 may consider the basic sector unit in performing the calculation of Equations 3 and 4.

In the step 1340, the analysis unit 430 may output the calculated position of the boot record.

The values used to calculate the position of the boot record described with reference to FIGS. 12 and 13 may determine the attribute values of the virtual partition to be described below or may be used to generate the virtual partition.

Figure 14:
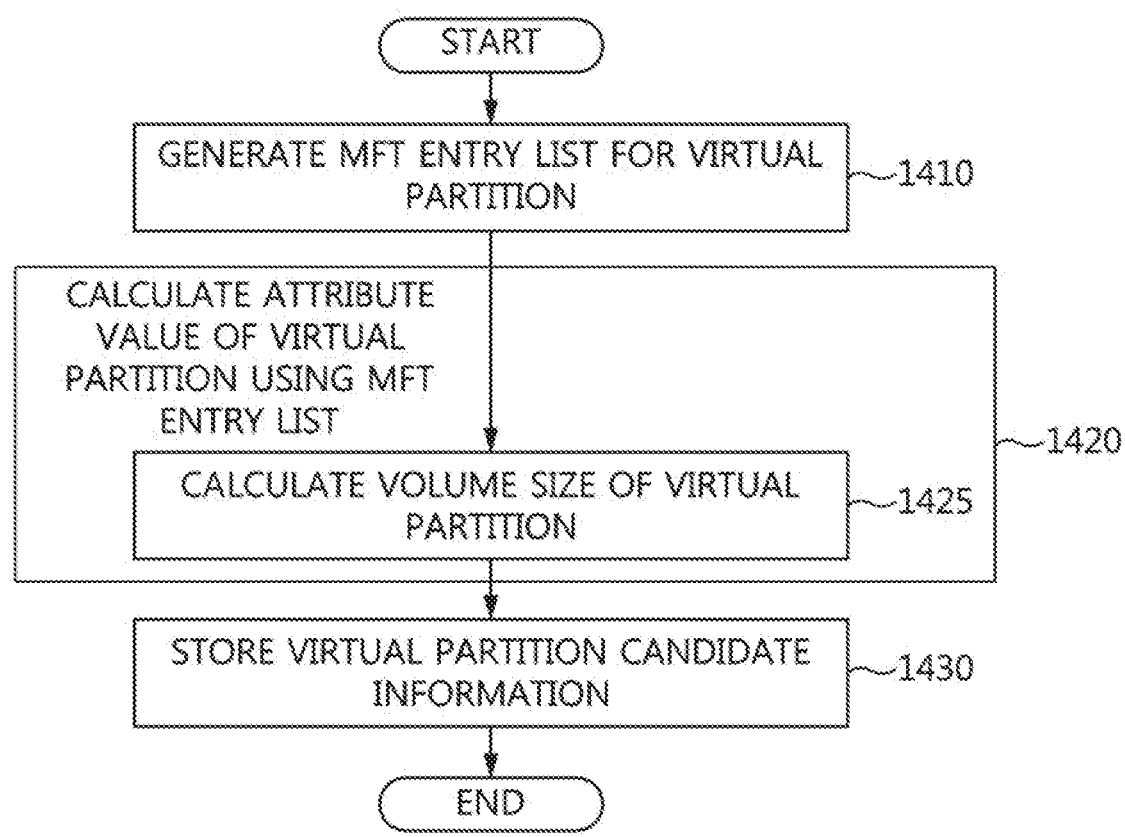
FIG. 14 is a flow chart of a method for generating virtual partition candidate information according to an exemplary embodiment.

FIG. 14 is a flow chart of a method for generating virtual partition candidate information according to an exemplary embodiment.

The virtual partition generated in the step 750 described with reference to FIG. 7 may be at least one. For each virtual partition of at least one virtual partition, the attribute value of the virtual partition may be used to generate the virtual partition.

The attribute values of the virtual partition may include the position of the boot record of the virtual partition, the volume size of the virtual partition, the cluster size of the virtual partition, the MFT entry size of the virtual partition.

To generate at least one virtual partition, at least one virtual partition candidate information may be used. The virtual partition candidate information may include information required to generate the virtual partition. For example, the virtual partition candidate information may include the attribute value of the virtual partition. To store the calculated attribute values, the virtual partition candidate information may be stored.

In the step 1410, for each virtual partition of at least one virtual partition, the generation unit 440 may generate the MFT entry list for each virtual partition.

The MFT entry list for the virtual partition may be the MFT entry list belonging to the virtual partition among at least one MFT entry of at least one MFT entry-data cluster pair candidate. As it were, in the step 1410, for each MFT entry of at least one MFT entry-data cluster pair candidate, the generation unit 440 may determine to which of at least one virtual partition each MFT entry belongs.

In the step 1420, for each virtual partition of at least one virtual partition, the generation unit 440 may use the MFT entry list for each virtual partition to calculate the attribute values of each virtual partition.

The attribute values of the virtual partition may be calculated by the method described with reference to FIGS. 11A to 13. Further, the generation unit 440 may use the attribution values of the virtual partition generated in the step(s) described with reference to FIGS. 11A to 13. Therefore, an overlapped description will be omitted.

The step 1420 may include a step 1425.

In the step 1425, for each virtual partition of at least one virtual partition, the generation unit 440 may use the MFT entry list for each virtual partition to calculate the volume size of each virtual partition.

The generation unit 440 may use the LCN address having the largest value among at least one LCN address calculated for at least one MFT entry of the Miff entry list for the virtual partition to calculate the volume size of the virtual partition.

The method for calculate the volume size of the virtual partition according to an exemplary embodiment will be described below with reference to FIG. 15.

In the step 1430, the generation unit 440 may store at least one virtual partition candidate information for at least one virtual partition. Alternatively, the generation unit 440 may store the attribute values of at least one virtual partition.

Figure 15:
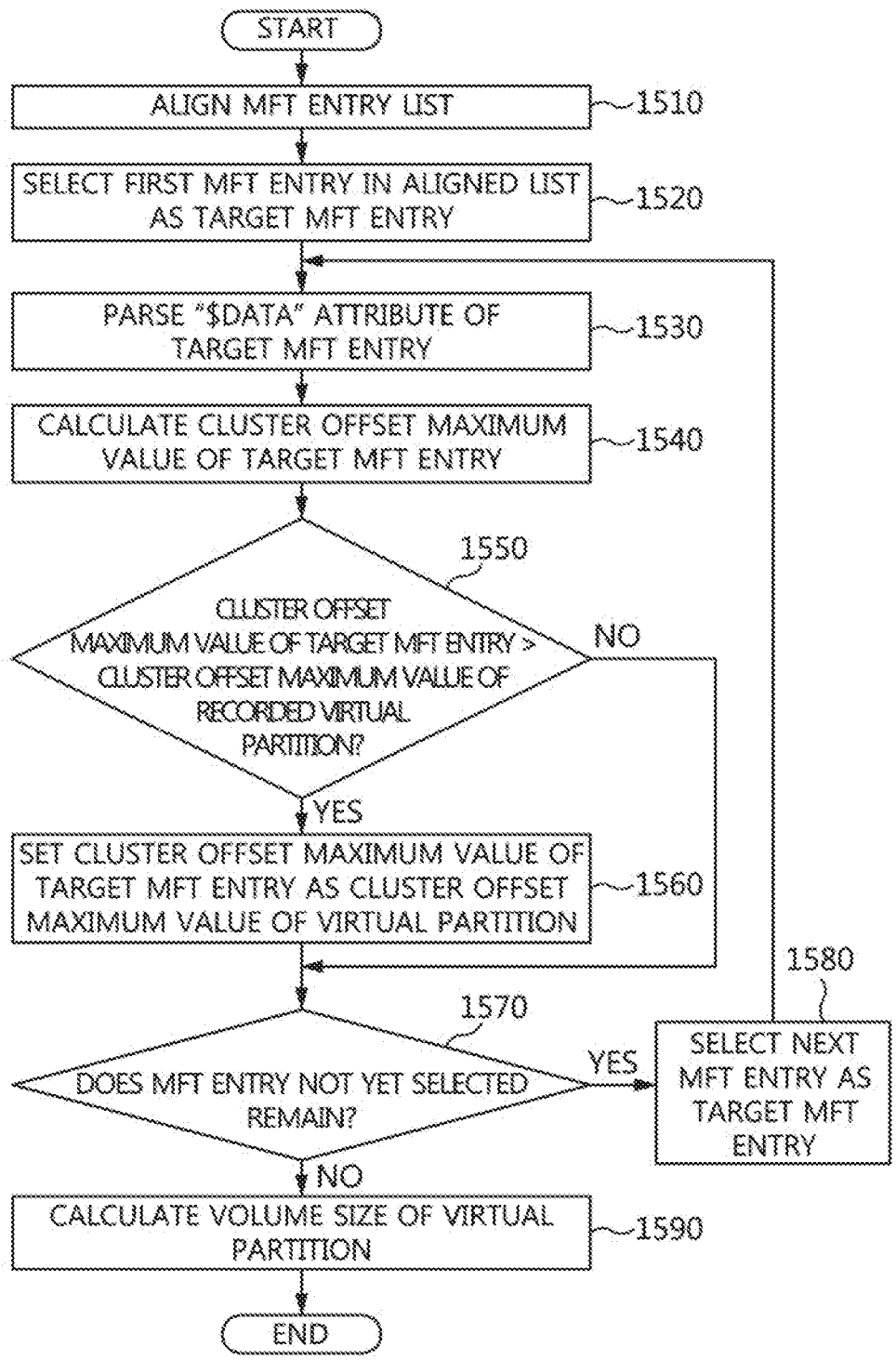
FIG. 15 is a diagram illustrating a method for calculating a volume size of a virtual partition according to an exemplary embodiment.

FIG. 15 is a diagram illustrating a method for calculating a volume size of a virtual partition according to an exemplary embodiment.

The step 1425 described with reference to FIG. 14 may include at least one of the following steps 1510, 1520, 1530, 1540, 1550, 1560, 1570, 1580, and 1590.

In the step 1510, the generation unit 440 may align the MFT entry list for the virtual partition. The generation unit 440 may align at least one MFT entry of the MFT entry list. The generation unit 440 may align the MFT entry list based on an MFT identifier of at least one MFT entry.

In the step 1520, the generation unit 440 may select a first MFT entry in the aligned list as the target MFT entry.

In the step 1530, the generation unit 440 may parse the "$Data" attribute of the target MFT entry.

After the parsing is performed, in the step 1540, the generation unit 440 may analyze the header of the "non-resident" attribute of the "$Data" attribute of the target MFT entry.

The generation unit 440 may acquire the start position cluster offset "MEStartClusterOffset" of the target MFT entry and the number "DefinedMETotalCluster" of clusters of the target MFT entry by analyzing the predefined offset of the header of the "non-resident" attribute of the "$Data" attribute of the target MFT entry. The predefined offset may be the "data cluster run list" offsets. The "data cluster run list" offsets may be offsets that are equal to or more than 64.

By the analysis, the generation unit 440 may acquire at least one of the start position cluster offset "MEStartClusterOffset" and the number "DefinedMETotalCluster" of clusters that correspond to each other.

In the step 1540, the generation unit 440 may calculate a cluster offset maximum value of the target MFT entry.

The generation unit 440 may calculate sums of the start position cluster offset "MEStartClusterOffset" and the number "DefinedMETotalCluster" of clusters that correspond to each other. The generation unit 440 may set a maximum value of the sums of the start position cluster offset "MEStartClusterOffset" and the number "DefinedMETotalCluster" of clusters that correspond to each other as the cluster offset maximum value of the target MFT entry.

Alternatively, the generation unit 440 may select a maximum start position cluster offset of at least one start position cluster offset "MEStartClusterOffset" that a "data cluster run list" indicates and may set a sum of the maximum start position cluster offset and the number "DefinedMETotalCluster" of clusters corresponding to the maximum start position cluster offset as the cluster offset maximum value of the target MFT entry.

In the step 1550, the generation unit 440 may compare the cluster offset maximum value of the target MFT entry with the cluster offset maximum value of the currently recorded virtual partition.

When the cluster offset maximum value of the target MFT entry is larger than the cluster offset maximum value of the currently recorded virtual partition, the step 1560 may be performed. When the cluster offset maximum value of the target MFT entry is equal to or less than the cluster offset maximum value of the currently recorded virtual partition, the step 1570 may be performed.

In the step 1560, the generation unit 440 may set the cluster offset maximum value of the target MFT entry as the cluster offset maximum value of the virtual partition. As it were, the generation unit 440 may set the cluster offset maximum value of the target MFT entry as the cluster offset maximum value of the virtual partition and may record it.

By the steps 1550 and 1560, the generation unit 440 may store the larger value of the duster offset maximum value of the target MFT entry and the existing cluster offset maximum value of the virtual partition as a new cluster offset maximum value of the virtual partition.

In the step 1570, the generation unit 440 may determine whether non-selected MFT entries remain in at least one aligned MFT entry. When the non-selected MFT entries do not remain in the at least one aligned MFT entry, the step 1590 may be performed. When the non-selected MFT entries remain in the at least one aligned MFT entry, the step 1580 may be performed.

In the step 1580, the generation unit 440 may select a next MFT entry of the target MFT entry of the at least one MFT entry as a new target MFT entry.

After the step 1580, the step 1530 may be repeated.

In the step 1590, the generation unit 440 may use the cluster offset maximum value of the virtual partition and the position of the boot record of the virtual partition to calculate the volume size of the virtual partition.

For example, the volume size of the virtual partition may correspond to the final position or the final sector of the virtual partition that are indicated by the cluster offset maximum value of the virtual partition and the position of the boot record of the virtual partition.

For example, when the volume size is smaller than the minimum size of the partition, the size from the boot record to the final sector of the disc may be calculated as the volume size.

Figure 16:
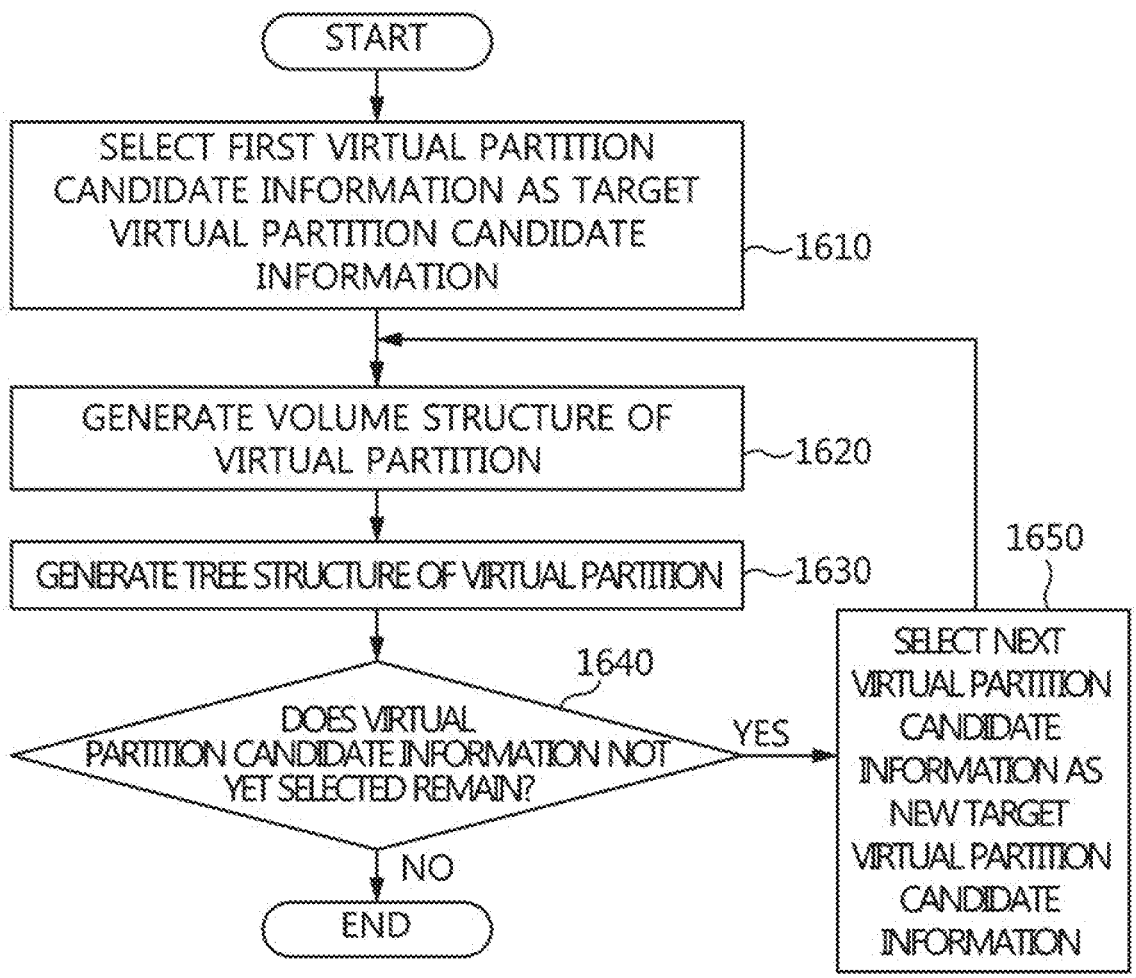
FIG. 16 is a flow chart of a method for generating a virtual partition according to an exemplary embodiment.

FIG. 16 is a flow chart of a method for generating a virtual partition according to an exemplary embodiment.

The step 750 described with reference to FIG. 7 may include steps 1610, 1620, 1630, 1640, and 1650 to be described below.

In the step 1610, the generation unit 440 may select first virtual partition candidate information of at least one virtual partition candidate information as the target virtual partition candidate information.

In the step 1620, the generation unit 440 may use the target virtual partition candidate information to generate the volume structure of the virtual partition corresponding to the target virtual partition candidate information.

In the step 1630, the generation unit 440 may use the MFT entry list for the virtual partition to generate the tree structure of the virtual partition. The generation unit 440 may use the MFT entry candidate belonging to the virtual partition of at least one MFT entry candidate to recover the file of the virtual partition.

In the step 1640, the generation unit 440 may determine whether non-selected virtual partition candidate information of at least one virtual partition candidate information remains. When the non-selected virtual partition candidate information does not remain, the procedure may end. When the non-selected virtual partition candidate information remains, the step 1650 may be performed.

In the step 1650, the generation unit 440 may select next virtual partition candidate information of the target virtual partition candidate information of at least one virtual partition candidate information as new target virtual partition candidate information. After that, the step 1620 may be repeated.

Figure 17A:
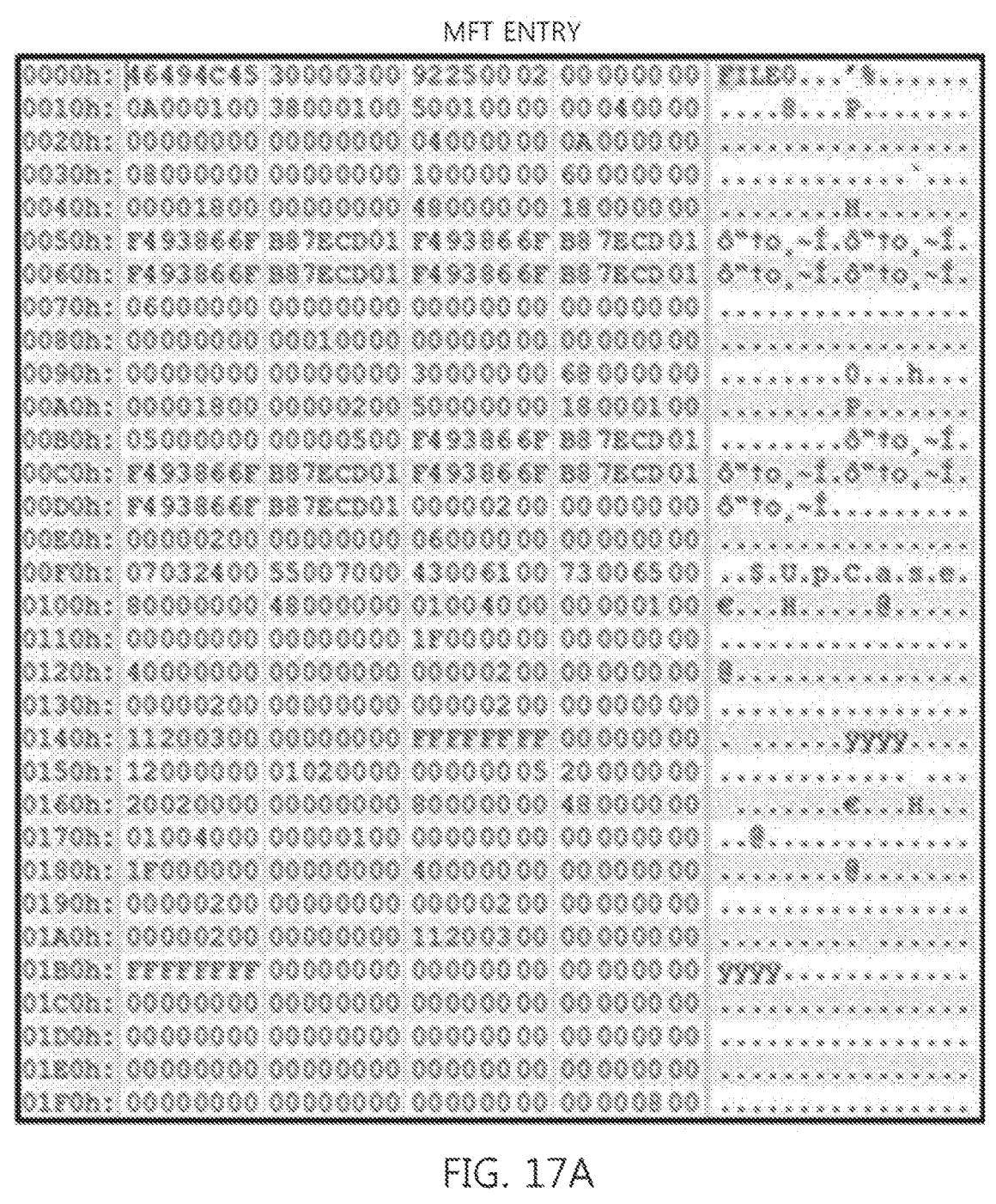
Figure 17B:
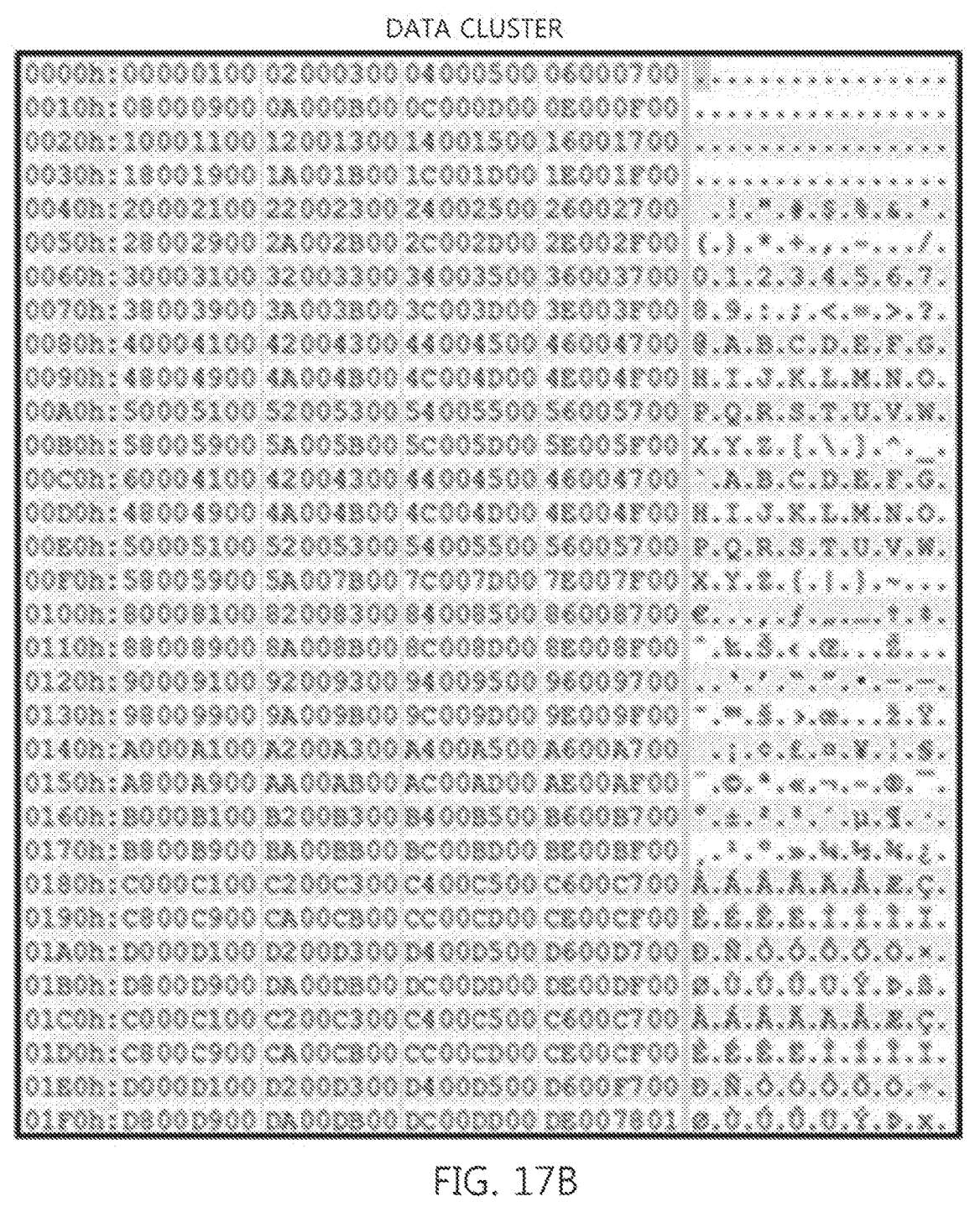

FIGS. 17A and 17B are diagrams illustrating a predefined MFT entry and data of the predefined MFT entry according to an exemplary embodiment.

The predefined MFT entry may indicate the MFT entry candidate and the data of the predefined MFT entry may indicate the data cluster candidate.

FIG. 17A is a diagram illustrating the predefined MFT entry according to the exemplary embodiment.

According to the exemplary embodiment, the predefined MFT entry may be a $UpCase metadata file illustrated.

FIG. 17A illustrates one sector of the MFT entry of the $UpCase metadata file.

The MFT identifier of the NTFS of the $UpCase metadata file may be No. 10. In FIG. 17A, offsets of 44 to 47 indicate the MFT identifier of the NTFS and "0A 00 00 00" that is a value of offsets of 44 to 47 may indicate indicates a value of 10.

A real size of the illustrated $UpCase metadata file may be 131,072 bytes. Here, the real size may be a logical size.

FIG. 17B is a diagram illustrating the data of the predefined MFT entry according to the exemplary embodiment.

FIG. 17B illustrates one sector of the data cluster of the $UpCase metadata file.

The $UpCase metadata file in FIGS. 17A and 17B is only an example of the predefined MFT entry. If the collection unit 420 identifies the MFT entry and the data cluster corresponding to each other within the same partition by the predefined signature, etc., the collection unit 420 may use the MFT entry and the data cluster corresponding to each other as the predefined MFT entry and the predefined data cluster. As it were, the MFT entry and the data cluster corresponding to each other may be used as the MFT entry candidate and the data cluster candidate.

FIG. 18 is a diagram illustrating an NTFS boot record according to an exemplary embodiment.

FIG. 18 illustrates a name and a description for the offset of the boot record.

FIG. 19 is a diagram illustrating an MFT entry header structure according to an exemplary embodiment.

FIG. 19 illustrates a name and a description for the offset of the MFT entry header.

FIGS. 20A to 20C are diagrams illustrating an MFT entry attribute header structure according to an exemplary embodiment.

FIG. 20A is a diagram illustrating a portion of the MFT entry attribute header structure according to the exemplary embodiment.

FIG. 20 illustrates a name and a description for the offset of the MFT entry attribute header.

FIG. 20B is a diagram illustrating a resident attribute of the MFT entry attribute header structure according to the exemplary embodiment.

The resident attribute may be used when a non-resident flag value is "00".

FIG. 20C is a diagram illustrating a non-resident attribute of the MFT entry attribute header structure according to the exemplary embodiment.

The non-resident attribute may be used when a non-resident flag value is "00".

FIG. 21 is a diagram illustrating a structure an MFT entry list according to an exemplary embodiment.

As illustrated, the MFT entry list may include an identifier of a start MFT entry, a physical sector offset of the start MFT entry, and the number of MFT entries. The continued MFT entries may be managed by one structure. A plurality of structures for a split stored MFT entries may be generated and the split stored MFT entries may be managed by a data structure of the plurality of structures.

The MFT entry list may be effectively managed by the structure.

FIG. 22 is a diagram illustrating a structure of at least one MFT entry candidate according to the exemplary embodiment.

As illustrated, the MFT entry candidate may include an identifier of the start MFT entry, a physical sector offset of the start MFT entry, and a size of the MFT entry candidate. The structure may be generated as many as the number of respective MFT entry candidates. The generated structure may be managed by the data structure.

At least one MFT entry candidate may be effectively managed by the structure.

FIG. 23 is a diagram illustrating a structure of at least one data cluster candidate according to the exemplary embodiment.

As illustrated, the data cluster candidate may include an identifier of a start data cluster candidate, a physical sector offset of the data cluster candidate, and a size of the data cluster candidate. The structure may be generated as many as the number of respective data cluster candidates. The generated structure may be managed by the data structure.

At least one data cluster candidate may be effectively managed by the structure.

According to the exemplary embodiments of the present invention, it is possible to provide the method and apparatus for recovery of a partition using the data maintaining the file or directory information even when the data maintaining the partition information of the disc, the data maintaining the volume information, and the data maintaining the MFT information of the file system are damaged.

According to the exemplary embodiments of the present invention, it is possible to provide the method and apparatus for detecting traces of a malicious code and coping with the intrusion accident, by recovering the layout of the partition using the data maintaining the file or directory information even when the disc is destroyed by the cyber terror, etc.

According to the exemplary embodiments of the present invention, it is possible to provide the method and apparatus for recovery of a partition using a multi-processor capable of shortening the search time for even the large-capacity disc or the evidence image.

The methods according to the exemplary embodiments of the present invention may be implemented in a form of program instructions that may be executed through various computer means and may be recorded in a computer-readable recording medium. The computer-readable recording medium may include a program instruction, a data file, a data structure or the like, alone or a combination thereof. The program instructions recorded in the computer-readable recording medium may be especially designed and constituted for the exemplary embodiments or be known to those skilled in a field of computer software. An example of the computer readable recording medium may include magnetic media such as hard disk, floppy disk, magnetic tape, and the like, optical media such as CD-ROM, DVD, and the like, magneto-optical media such as floptical disk, and hardware devices specially configured to store and perform program instructions such as ROM, RAM, flash memory, and the like. Examples of the program instructions may include a high-level language code capable of being executed by a computer using an interpreter, or the like, as well as a machine language code made by a compiler. The hardware device may be constituted to be operated as one more software modules in order to perform the action according to the exemplary embodiments, and vise versa.

The present invention is described with reference to the limited exemplary embodiments and drawings, but may be variously modified and changed by those skilled in the art from the above description. For example, the describe technologies are performed by a different order from the foregoing method, and/or components of the described system, structure, apparatus, circuit, etc., may be coupled or combined in different forms from the described method or even though the components may be replaced by or substituted into other components or equivalents, the appropriate results may be achieved.

Therefore, equivalents to other implementations, other exemplary embodiments, and claims are included in claims to be described below.

What is claimed is:

1. A method for recovery of a file system, comprising:
generating at least one master file table (MFT) entry list in a disc or an evidence image and collecting at least one data cluster candidate;
generating at least one MFT entry-data cluster pair candidate using the MFT entry list and the at least one data cluster candidate;
determining an attribute value of a virtual partition stored in virtual partition candidate information of at least one MFT entry-data cluster pair candidate; and
generating the virtual partition based on the stored attribute value,
wherein each MFT entry-data cluster pair candidate of the at least one MFT entry-data cluster pair candidate is a pair of data cluster candidates satisfying a predefined condition in which the MFT entry candidate and the at least one data cluster candidate are data from within a same virtual partition, and the MFT entry candidate satisfies the predefined condition among the at least one MFT entry of the MFT entry list,
the attribute value includes a position of the boot record of the virtual partition in the disc or the evidence image and a MFT entry size of the virtual partition,
for each virtual partition of a plurality of virtual partitions, the MFT entry list for each virtual partition is generated,
for each virtual partition of the plurality of the virtual partitions, the MFT entry list for each virtual partition is used to calculate the attribute value of each virtual partition of the plurality of the virtual partitions, and
for each virtual partition of the plurality of the virtual partitions, the MFT entry list for each virtual partition is used to calculate a volume size of each virtual partition of the plurality of the virtual partitions.

2. The method of claim 1, wherein the collecting is performed on a plurality of segmented regions of the disc or the evidence image, respectively, in parallel by a plurality of execution units.

3. The method of claim 2, wherein the number of the plurality of execution units is determined based on a size of the disc or the evidence image and the number of processors of an apparatus for recovery of a file system performing the method for recovery of a file system.

4. The method of claim 1, wherein the MFT entry candidate forming the at least one MFT entry-data cluster pair candidate is a predefined type of MFT entry.

5. The method of claim 4, wherein the predefined type of MFT entry is the MFT entry that provides mapping to a physical address from a logical cluster number (LCN) address recorded in the MFT entry.

6. The method of claim 4, wherein an MFT entry header of the predefined MFT entry includes a predefined MFT entry header signature.

7. The method of claim 4, wherein the collecting includes:
determining a position at which data are read in the disc or the evidence image using an MFT minimum generation unit;

when an MFT entry is detected at the position, adding the detected MFT entry to the MFT entry list; and
before the added MFT entry, when at least one reversely continued MFT entry is detected, adding the at least one reversely continued MFT entry to the MFT entry list.

8. The method of claim 7, wherein the adding of the detected MFT entry to the MFT entry list includes:
reading data at the determined position;
determining the read data as the MFT entry when a predefined region among the read data has a value of a predefined MFT entry header signature; and
if it is determined that the read data are the MFT entry, adding the read data to the MFT entry list as the MFT entry.

9. The method of claim 7, wherein the adding further includes moving the position as much as the MFT minimum generation unit.

10. The method of claim 1, wherein the generating of the at least one MFT entry-data cluster pair candidate includes:
calculating a position of a boot record using a target MFT entry candidate among the at least one MFT entry candidate of the MFT entry list and a target data cluster candidate among the at least one data cluster candidate;
determining whether the target MFT entry candidate and the target data cluster candidate are data within the same partition based on the position of the boot record; and
if it is determined that the target MFT entry candidate and the target data cluster candidate are data within the same partition, adding a pair of the target MFT entry candidate and the target data cluster candidate to the at least one MFT entry-data cluster pair candidate.

11. The method of claim 10, wherein the position of the boot record is calculated based on a relative position between the target MFT entry candidate and the target data cluster candidate.

12. The method of claim 10, wherein the calculating of the position of the boot record includes:
acquiring an attribute value of the target MFT entry candidate;
acquiring an attribute value of the target data cluster candidate; and
calculating the position of the boot record using the attribute value of the target MFT entry candidate and the attribute values of the target data cluster candidate.

13. The method of claim 12, wherein the attribute value of the target MFT entry candidate includes an MFT entry file size, an MFT entry file start position cluster offset, and the number of MFT entry file clusters, and
the attribute value of the target data cluster includes a current physical sensor offset.

14. The method of claim 13, wherein the physical sector offset of the boot record is calculated based on the current physical sector offset, the MFT entry file start position cluster offset, and the number of bytes per the cluster of the virtual partition, and
the number of bytes per the cluster is determined based on the MFT entry file size and the number of MFT entry file cluster.

15. The method of claim 12, wherein the attribute value of the at least one MFT entry includes a directory index size, a directory index start position cluster offset, and the number of directory index clusters of the MFT entry, and
the attribute value of the at least one target data cluster candidate includes a physical sector offset of the data cluster candidate.

16. The method of claim 1, wherein the attribute value of the virtual partition includes a volume size of the virtual partition.

17. The method of claim 16, wherein the volume size is calculated based on a cluster offset maximum value of the virtual partition and a position of a boot record of the virtual partition.

18. An apparatus for recovery of a file system, comprising:
a collection unit configured to generate at least one master file table (MFT) entry list in a disc or an evidence image and collect at least one data cluster candidate;
an analysis unit configured to generate at least one MFT entry-data cluster pair candidate using the MFT entry list and the at least one data cluster candidate; and
a generation unit configured to analyze virtual partition candidate information of the at least one MFT entry-data cluster pair candidate to determine a stored attribute value of a virtual partition and generate the virtual partition based on the attribute value,
wherein each MFT entry-data cluster pair candidate of the at least one MFT entry-data cluster pair candidate is a pair of data cluster candidates satisfying a predefined condition in which the MFT entry candidate and the at least one data cluster candidate are data from within a same virtual partition, and the MFT entry candidate satisfies the predefined condition among the at least one MFT entry of the MFT entry list
the attribute value includes a position of the boot record of the virtual partition in the disc or the evidence image and a MFT entry size of the virtual partition,
for each virtual partition of a plurality of virtual partitions, the MFT entry list for each virtual partition is generated,
for each virtual partition of the plurality of the virtual partitions, the MFT entry list for each virtual partition is used to calculate the attribute value of each virtual partition of the plurality of the virtual partitions, and
for each virtual partition of the plurality of the virtual partitions, the MFT entry list for each virtual partition is used to calculate a volume size of each virtual partition of the plurality of the virtual partitions.

* * * * *